US006654432B1

United States Patent
O'Shea et al.

(10) Patent No.: US 6,654,432 B1
(45) Date of Patent: Nov. 25, 2003

(54) JOINT MAXIMUM LIKELIHOOD FRAME AND TIMING ESTIMATION FOR A DIGITAL RECEIVER

(75) Inventors: Deirdre O'Shea, San Diego, CA (US); Ismail Lakkis, San Diego, CA (US); Saeid Safavi, San Diego, CA (US); Masood K. Tayebi, San Diego, CA (US)

(73) Assignee: Wireless Facilities, Inc., San Diego, CA (US)

( * ) Notice: Subject to any disclaimer, the term of this patent is extended or adjusted under 35 U.S.C. 154(b) by 0 days.

(21) Appl. No.: 09/093,414

(22) Filed: Jun. 8, 1998

(51) Int. Cl.$^7$ ................................................. H04L 7/00
(52) U.S. Cl. ........................................................ 375/354
(58) Field of Search ................................. 375/326, 324, 375/340, 136, 355, 369, 365, 373, 376, 346, 344, 348, 371, 354

(56) References Cited

U.S. PATENT DOCUMENTS

| | | | |
|---|---|---|---|
| 3,943,346 A | 3/1976 | Urkowitz et al. ........... 235/152 |
| 4,020,332 A | 4/1977 | Crochiere et al. .......... 235/152 |
| 4,471,480 A | 9/1984 | Haussmann et al. | |
| 4,599,732 A | * 7/1986 | LeFever ...................... 375/346 |
| 4,866,647 A | 9/1989 | Farrow .................... 364/724.1 |
| 5,249,205 A | * 9/1993 | Chennakeshu et al. ..... 375/348 |
| 5,283,814 A | * 2/1994 | Iwahashi et al. ............ 375/245 |
| 5,285,480 A | 2/1994 | Chennakeshu et al. ..... 375/348 |
| 5,309,420 A | * 5/1994 | Nakamura et al. .......... 370/420 |
| 5,361,276 A | 11/1994 | Subramanian ................. 375/1 |
| 5,541,965 A | 7/1996 | Daffara ....................... 375/326 |
| 5,555,247 A | 9/1996 | Matsuoka et al. | |
| 5,612,975 A | * 3/1997 | Becker et al. ............... 375/319 |
| 5,802,117 A | 9/1998 | Ghosh ........................ 375/267 |
| 5,805,619 A | 9/1998 | Gardner et al. ............. 714/814 |
| 5,854,570 A | 12/1998 | Schmidt ..................... 329/304 |
| 5,870,438 A | * 2/1999 | Olafsson .................... 375/344 |
| 5,933,467 A | 8/1999 | Sehier et al. ............... 375/350 |
| 6,002,729 A | 12/1999 | Schmidt ..................... 375/364 |
| 6,134,286 A | 10/2000 | Chennakeshu et al. ..... 375/365 |
| 6,175,600 B1 | 1/2001 | Guillemain et al. ........ 375/326 |

FOREIGN PATENT DOCUMENTS

| GB | 2 213 025 A | 8/1989 |
|---|---|---|
| GB | 2 286 949 A | 8/1995 |

OTHER PUBLICATIONS

Classen et al, An All Feedforward Synchronization Unit for Digital Radio, Proc. of VTC, PP738–741, May 1993.*
Classen, F., Meyr, H., and Sehier, P., Proc. of VTC '93, pp. 738–741, Secausus, NJ, May 18, 1993 "An all Feedforward Synchronization Unit for Digital Radio".

(List continued on next page.)

*Primary Examiner*—Chi Pham
*Assistant Examiner*—Kevin M Burd
(74) *Attorney, Agent, or Firm*—Knobbe Martens Olson & Bear LLP

(57) ABSTRACT

A receiver for receiving a signal stream in a digital radio communication system. The signal stream includes data frames where each frame including a data signal sequence and a synchronizing signal sequence. The communication system synchronizes the receiver by employing the signal stream. The receiver includes a sampling circuit for sampling symbol levels in the synchronizing signal sequence and a synchronization subsystem. The synchronization subsystem utilizes a frame synchronization circuit, a dynamic interpolator and a decision-directed phase tracking mechanism for removing residual frequency and phase offsets. The synchronization subsystem also includes a threshold detection mechanism for comparing values derived from the sampled frame synchronization output with a predefined value which determines whether synchronization has occurred or not. The dynamic interpolator includes a circuit for generating the interpolation coefficients for timing and initial phase estimation, a maximum likelihood timing and phase estimator, and a data interpolation and decimation unit. The estimated timing offset and phase offset in the dynamic interpolator may change for each frame in the signal stream.

21 Claims, 13 Drawing Sheets

OTHER PUBLICATIONS

De Gaudenzi, R., Luise, M. and Viola, R., IEEE Transactions on Communications, vol. 41, No. 11, pp. 1760–1769, Nov. 1993 "A Digital Chip Timing Recovery Loop for Band–Limited Direct–Sequence Spread–Spectrum Signals".

Erup, L., Gardner, F. M. and Harris, R.A., IEEE Transactions on Communications, vol. 41, No. 6, pp. 998–1008, Jun. 1993 "Interpolation in Digital Modems–Part II: Implementation and Performance".

Gardner, F.M., IEEE Transactions on Communications, vol. 41, No. 3, pp. 501–507, Mar. 1993 "Interpolation in Digital Modems–Part 1: Fundamentals".

Gardner, F.M., IEEE Transaction on Communications, vol. 34, No. 5, pp. 423–429, May 1986 "A BPSK/QPSK Timing–Error Detector for Sampled Receivers".

Lambrette, U., Langhammer, K. and Meyr, H., IEEE GlobeCom 1996 "Variable Sample Rate Digital Feedback NDA Timing Synchronization".

Mengali, U. and D'Andrea, A., Synchronization Techniques for Digital Receivers, P. 398, 1998 "Feedforward Estimation Schemes".

Meyers, M. H. and Franks, L. E., IEEE Transactions on Communications, vol. 28, No. 8, pp. 1121–1129, Aug. 1980 "Joint Carrier Phase and Symbol Timing Recovery for PAM Systems".

Meyr, H., Moeneclaey, M and Fechtel, S.A., Digital Communication Receivers: Synchronization, Channel Estimation and Signal Processing, Proakis, J., John Wiley Publishers., pp. 289–295, 1998 "NDA Timing Parameter Estimation by Spectral Estimation".

Moeneclaey, M. and Bucket, K., Signal Processing in Telecommunications, pp. 171–182, Sep. 1995, "Timing Correction by Means of Digital Interpolation".

Morelli, M., D'Andrea A. N. and Mengali, U., IEEE Communications Letters, vol. 1, No. 3, pp. 80–82, May 1997 "Feedforward ML–Based Timing Estimation with PSK Signals".

Oerder, M. and Meyr, H., IEEE Transactions on Communications, vol. 36, No. 5, pp. 605–611, May 1988 "Digital Filter and Square Timing Recovery".

Panayirci, E. and Bar–Ness, E. Y., IEEE Transactions on Communications, Vol 44, No. 1, pp. 29–33, Jan. 1996 "A New Approach for Evaluating the Performance of a Symbol Timing Recovery System Employing a General Type of Nonlinearity".

Proakis, J. G., Digital Communications, Third Edition, Chp. 6, McGraw–Hill Publishers, pp. 333–373, and pp. 536–537 "Carrier and Symbol Synchronization".

Vesma, J., Renfors, M and Rinne, J., IEEE GlobeCom 1996 "Comparison of Efficient Interpolation Techniques for Symbol Timing Recovery".

Zhang, P., Short, R. T. and Chen, X. X., IEEE GlobeCom 1996 "Fast Timing Estimation for CDMA Waveforms in a Near–Far Environment".

\* cited by examiner

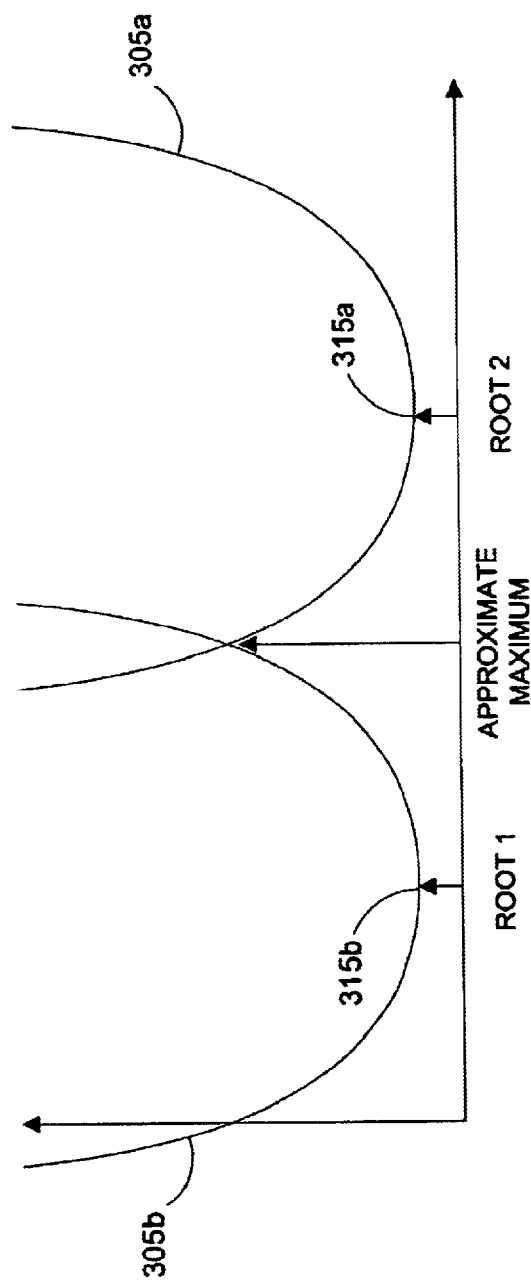
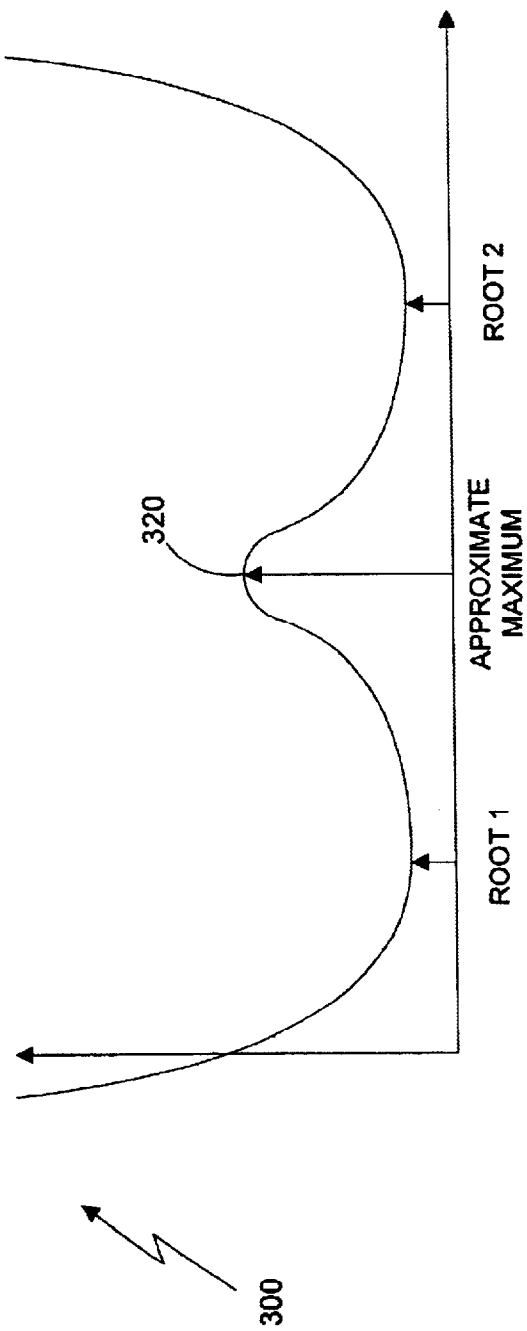

JOINT MAXIMUM LIKELIHOOD FRAME AND TIMING ESTIMATION FOR A DIGITAL RECEIVER

BACKGROUND OF THE INVENTION

1. Field of the Invention

The invention relates generally to communication systems, and more particularly to an apparatus and method for achieving synchronization in digital receivers used in communication systems.

2. Related Art

In synchronous digital transmission, information is conveyed by uniformly spaced pulses and the function of any receiver is to isolate these pulses as accurately as possible. However, due to the noisy nature of the transmission channel, the received signal has undergone changes during transmission and an estimation of certain reference parameters is necessary prior to data detection. Estimation theory proposes various techniques for estimating these parameters depending on what is known of their characteristics. One such example technique is called maximum likelihood (ML). A maximum likelihood estimation assumes the parameters are deterministic or, at most, slowly varying over the time interval of interest. The term deterministic implies the parameters are unknown but of a constant value and are, therefore, not changing over time. These unknown parameters can cover factors such as the optimum sampling location, the start of a packet (or a frame marker for continuous data streams) or the phase offset introduced in the channel or induced by instabilities between the transmitter and receiver oscillators. It is widely recognized that maximum likelihood estimation techniques offer a systematic and conceptually simple guide to the solution of synchronization problems. Maximum likelihood offers two significant advantages: it leads to appropriate circuit configuration and provides near optimum or optimum performance depending on the known channel conditions (J. G. Proakis, "Digital Communications," Third Edition, McGraw-Hill Publishers, pp. 333–336, 1995).

Generally, if the transmitter does not generate a pilot synchronization signal, the receiver must derive symbol timing from the received signal. The term symbol is used in this context to refer to transmitted signals that are phase modulated with discrete phase relationships, where each assigned phase relationship is a symbol that is subject to detection at the receiver. Both the transmitter and receiver employ separate clocks which drift relative to each other, and any symbol synchronization technique must be able to track such drift. Therefore choosing the proper sampling instants for reliable data detection is critical, and failure to sample at the correct instants leads to Inter-Symbol Interference (ISI), which can be especially severe in sharply bandlimited signals (M. H. Meyers and L. E. Franks, "Joint Carrier Phase and Symbol Timing Recovery for PAM Systems," IEEE Transactions on Communications, COM-28(8):1121–1129, 1977). The term ISI refers to two or more symbols that are superimposed upon each other; phase detection of each symbol, thus, becomes extremely difficult. Incorrect sampling implies the receiver is inadvertently sampling the signal where the influence of the previous data symbol is still present (J. G. Proakis, "Digital Communications," Third Edition, McGraw-Hill Publishers, pp. 536–537, 1995).

In a receiver, the signal following demodulation is first passed through a matched filter and sampled. The optimum sampling times correspond to the maximum eye opening and are located approximately at the peaks of the signal pulses. The term "eye opening" refers to the amplitude variations of the signal at the output of the pulse-shaping filter. An eye is formed by superimposing the output of the pulse shaping filter for each symbol upon the other until the central portion takes on the shape of an eye as illustrated in FIGS. 10a and 10b. Note that at high signal to noise conditions, the "eye" is open, whereas at low signal to noise conditions, the "eye" is closed.

Among synchronization systems, a distinction is made between feedforward and feedback systems. A feedback system uses the signal available at the system output to update future parameter estimates. Feedforward systems process the received signal to generate the desired estimate without explicit use of the system output. A particular form of feedback system is data directed. Data directed techniques make explicit use of prior data decisions to estimate the current estimate of the unknown parameter, which is then used to update the data decisions (J. G. Proakis, "Digital Communications," Third Edition, McGraw-Hill Publishers, pp. 333–336, 1995). Whether the design approach is feedforward or feedback, both techniques are related to the maximum likelihood parameter estimation. Both feedforward and feedback techniques are being used in the current technology. However, it should be noted that there are advantages and disadvantages associated with both approaches. The disadvantages of feedback techniques are well documented in the literature (U. Mengali and N. D'Andrea, "Synchronization Techniques for Digital Receivers," Plenum Press Publishers, p. 398, 1998).

There are two alternatives to receiver design namely, coherent demodulation and non-coherent demodulation. Coherent demodulation is used when optimum error performance is essential. This implies that the baseband data signal is derived making use of a local reference with the same frequency and phase as the incoming carrier. This requires accurate frequency and phase measurements insofar as phase errors introduce crosstalk between the in-phase and quadrature channels of the receiver and degrade the detection process. The extraction of the phase occurs in a process termed phase estimation. Furthermore, frequency estimation is necessary when the local receiver oscillator and the received signal frequency differ in frequency and phase by a sufficient amount such that phase recovery is not sufficient to ensure reliable data detection. Phase recovery algorithms have a limited pre-tracking ability, and when the phase offset exceeds the tracking ability of the phase recovery circuitry, frequency estimation becomes necessary. Depending on the phase/frequency offset present, frequency estimation algorithm have a much wider tracking range than their phase tracking counterparts. In fact frequency estimation is generally done first and followed by phase estimation.

An alternative receiver design approach is to use non-coherent demodulation techniques, such as differential demodulation where the phase difference between one data symbol and the next is assumed constant. In applications where simplicity and robustness of implementation are more important than achieving optimum performance, differentially coherent and non-coherent demodulation are attractive alternatives to coherent demodulation.

The effect of a poorly designed carrier loop increases the dispersion of the received symbols about their nominal values, bringing the received points considerably closer to the decision boundaries and decreasing the error margin. Of course, large phase perturbations can cause errors without any noise. Similarly, timing phase errors will cause the receiver to sample away from the maximum eye opening and reduce the margin for error. In traditional analog implemented receivers, synchronization is typically performed using an error tracking synchronizer whereby a feedback loop constantly adjusts the phase of a local clock to minimize the error between the estimated and the optimum sampling instant. Flexibility in the design of the synchronization unit in a receiver has increased in recent times with the advent of increasingly powerful silicon chips. This has led to the adoption of open loop (otherwise known as feedforward) estimation techniques for synchronization purposes.

Digital synchronization methods recover timing, phase and frequency estimates by operating only on signal samples taken at a suitable rate. FIGS. 11a and 11b illustrate the concept of sampling a signal. FIG. 11a illustrates that when oversampling occurs at a rate of four samples per symbol, the information available with regard to the received signal is much greater than that in FIG. 11b. This is in contrast to analog methods that operate on continuous time waveforms.

Digital circuits have an enormous appeal in communications technology and influence the design of all modern receivers. The advantages of a digital implementation are that it does not require re-alignment, it has less stringent tolerances, low power consumption and can easily be integrated into a low cost component.

With the advent of digital receiver design, there has been an increase in the development of techniques with no counterpart in analog receiver design. The most significant example of this is the application of interpolation and decimation to receiver design. This trend is in response to the increased use of all digital receivers where sampling of the received signal is asynchronous to the incoming data symbols. In such receivers, timing adjustment is done after sampling using data interpolation and decimation. To date, interpolation has been used to estimate the signal value at the optimum sampling instant using a timing offset which has been previously calculated using some established timing estimation algorithm {(F. M. Gardner, "A BPSK/QPSK Timing Error Detector for Sampled Receivers," IEEE Transactions on Communications, 34:423–429, May 1986) and (H. Meyr, M. Moeneclaey and S. A. Fechtel, "Digital Communication Receivers: Synchronization, Channel Estimation and Signal Processing", John Wiley publishers, pp. 289–295, 1998)}. Furthermore, to remove the redundant sampling instants produced by the asynchronous sampling of the received signal, a decimator follows the interpolator. The interpolator is essentially a rate conversion mechanism whereby the signals at the input and output are operating at two distinct, yet unrelated, sampling rates. In a feedforward arrangement, sampling is typically not directly synchronized to the data symbols, and subsequent processing must choose the optimum sampling instant without the luxury of altering the phase of the sampling clock (F. M. Gardner, "Interpolation in Digital Modems-Part 1: Fundamentals," IEEE Transactions on Communications, 41:501–507, March 1993). This problem has been overcome by the application of interpolation. Interpolation estimates the optimum sampling instant from the signal values obtained by oversampling the received signal. The use of interpolation is not a new development and has been applied for many years in signal processing (R. E. Crochiere and L. R. Rabiner, "Interpolation-Decimation Circuit for Increasing or Decreasing Digital Sampling Frequency," U.S. Pat. No. 4,020,332, issued Apr. 26, 1977). However, its applicability to receiver synchronization is a recent development {(R. De Gaudenzi, M. Luise and R. Viola, "A Digital Chip Timing Recovery Loop for Band-Limited Direct Sequence Spread Spectrum Signals," IEEE Transactions on Communications, 41(11):1760–1769, 1993) and (H. Meyr, M. Moeneclaey and S. A. Fechtel, "Digital Communication Receivers: Synchronization, Channel Estimation and Signal Processing", John Wiley publishers, pp. 289–295, 1998)}.

For synchronization purposes, the interest is not in regenerating the original analog waveform as is common in some traditional applications of interpolation to signal processing. Instead, only the optimum sampling instant corresponding to the location of the maximum "eye opening" is required. The maximum eye opening is where the output rate can not be considered as a multiple of the original sampling rate (F. M. Gardner, "Interpolation in Digital Modems-Part 1: Fundamentals," IEEE Transactions on Communications, 41:501–507, March 1993). The interpolated sample values can be computed entirely from knowledge of the input data sequence, the interpolating filter impulse response and the time instants of the input and output samples. To date many approximations have been suggested for the ideal interpolating filter response, the most popular shapes being linear, parabolic, piecewise parabolic, cubic and spline (L. Erup, F. M. Gardner and R. A. Harris, "Interpolation in Digital Modems-Part II: Implementation and Performance," IEEE Transactions on Communications, 41:998–1008, June 1993).

Frame synchronization is defined as determining the start of a predefined frame marker (or unique word) in a stream of continuously transmitted frames. This predefined data pattern is commonly referred to as a frame marker, a unique word, or a frame preamble, e.g., a two symbol Barker code, and is inserted into the data stream at the transmitter to indicate either the start of a discontinuous data stream, known as a packet, or as a marker inserted in a continuous data stream to keep track of the data. Reliable frame synchronization requires careful selection of the unique word to minimize correlation sidelobes and thereby the probability of false synchronization. The data immediately surrounding the unique word affects this selection. The unique word must not only have low aperiodic auto-correlation sidelobes to minimize the false synchronization probability with noise or random data, but also have low aperiodic auto-correlation sidelobes when preceded by a preamble. More specifically, if such a synchronization sequence is correlated with itself, the correlator generate a pulse output only when the sequences being correlated are aligned. At other times, the correlator's output is zero or nearly zero.

The methods described in the literature present many problems, such as complexity in having four or more samples per symbol for feedforward timing estimation. Therefore, at high data rates, feedforward parameter estimation requires a high data clock to sufficiently oversample the received signal for the established techniques in the literature. Another problem with feedback techniques used in the prior art is the acquisition time as well as the high probability of hangup and cycle slips associated with their phase locked loop (PLL) based structures (J. G. Proakis, "Digital Communications," Third Edition, McGraw-Hill Publishers, Chapter 6, pp. 333–373, 1995), especially in the presence of fading associated with the mobile communications channel. The term "hangup" refers to the situation where the initial phase error is close to 180 degrees, which can result in an extremely long transient time. In fact, there are cases where the loop may never recover from "hangup." The issue of "hangup" is very serious as it may occur under perfect noise conditions. Special circuits can be used to detect hangup and pull the PLL into its lock range. However, these are notoriously difficult to design for reliable operation. The term "cycle slip" refers to when the PLL oscillator drops or adds one oscillation cycle with reference to the input signal, which results in incorrect parameter estimation for a significant period depending on the estimator's loop bandwidth due to the residual effect of the sharp error signal and the instability introduced into the loop by such an event. These issues can have a detrimental effect on the receiver's symbol error rate and are solely due to the feedback nature of the traditional estimators.

These problems can be circumvented through the use of feedforward estimation. However, feedforward estimation techniques, in general, require a higher oversampling ratio than is prevalent in digital versions of analog feedback estimators (F. M. Gardner, "A BPSK/QPSK Timing Error Detector for Sampled Receivers," IEEE Transactions on Communications, 34:423–429, May 1986). Furthermore, in the current technology, feedforward algorithms for timing estimation require at least four samples per symbol for reliable operation. Additionally, the current technology does not exploit the information from the frame synchronization output to estimate both phase and timing offsets in digital receivers.

Consequently, what is desired is to provide both phase and timing estimation based on the information obtained from the frame synchronization in a digital receiver. A method for obtaining timing recovery and initial phase offset estimation by using an interpolator over the frame correlation output is needed. It is also desired to use the timing estimate to assist the data interpolation and decimation and to remove the residual phase offset remaining on the received signal. There is a need for a joint frame, timing offset and phase estimation method for any digital receiver within a communication system wherein a small number of samples per symbol, e.g., two, are employed.

SUMMARY OF THE INVENTION

One aspect of the invention includes a system and method of joint frame, timing and phase estimation for use in a digital receiver within a communication system. A synchronization block is provided, within a digital receiver, where the inputted data stream is processed using L samples per symbol and operates in a feedforward manner. This method exploits the information available from frame synchronization to estimate the timing offset and static phase offset introduced in the channel. The method uses a dynamic digital interpolator over the frame synchronization correlation output to estimate these unknown parameters. The phase estimate is then used to initially de-rotate the received signal to remove the effect of the static phase offset. The timing estimate is subsequently used by a data interpolator to estimate the value of the received signal corresponding to this sampling instant for each of the transmitted symbols. The redundant samples are removed by decimation. The decimated output signal is provided to a frequency and phase tracking circuit to remove any remaining phase or frequency offsets. The processed signal is then forwarded to other functional blocks such as a decoder, if source coding is used at the transmitter. This method is provided for a variety of digital receivers employing Code Division Multiple Access (CDMA), in which a transmitted signal is spread over a band of frequencies much wider than the minimum bandwidth required to transmit the signal, Time Division Multiple Access (TDMA), where the users share the radio spectrum in the time domain, Frequency Division Multiple Access (FDMA), where a user is allocated at least one unique frequency for communication without interference with users in the same frequency spectrum, or any combination of the above or other technologies.

In another aspect of the invention, a digital receiver system comprises a filtering block, a synchronization subsystem and other functional blocks. The filtering block comprises a pulse-shaping filter. The synchronization subsystem comprises a frame synchronization and detection block, a timing estimation and initial phase offset estimation block, a real-time phase and frequency tracking block, and an interpolator and decimator. The filtering block receives signals from an Intermediate Frequency (IF) block which have been demodulated to baseband. These signals may be sampled by an Analog to Digital Converter (ADC) with a fixed clock (sampling clock=46.7 MHz). It is necessary to note that the signals received by the filtering block within the digital receiver may not be sampled, and that the sampling may take place only after the filtering block. The outputted signals from the filtering block are then fed to the synchronization subsystem for further processing.

In another aspect of the invention, there is a synchronization circuit, comprising a frame synchronizer receiving a data stream that includes data frames; and a dynamic interpolation module receiving the data stream and generating an estimated timing offset and a timing corrected data stream, wherein the dynamic interpolation module includes a timing estimator that utilizes the output of the frame synchronizer to estimate a timing offset, and wherein the estimated timing offset may change for each frame of the data stream.

In another aspect of the invention, there is a method of synchronizing a digital communications receiver, comprising receiving a signal stream comprising a plurality of data frames, obtaining a frame synchronization signal from the signal stream, and dynamically interpolating a phase offset and a timing offset of the signal stream from the frame synchronization signal.

In another aspect of the invention, there is a method of receiving a signal stream in a digital communications receiver, comprising providing an analog signal stream, converting the analog signal stream to a digital signal stream, correlating a unique word with the digital signal stream, detecting a threshold to determine whether frame synchronization has occurred generating coefficients for timing estimation and phase estimation, estimating a timing offset and a phase offset for the digital signal stream, generating a timing corrected and initial phase corrected signal stream from the estimated timing offset, estimated phase offset and the digital signal stream, and removing residual phase offsets from the timing corrected and initial phase corrected signal stream.

In another aspect of the invention, there is a system for detecting data, comprising a frame synchronizer receiving a data stream, a timing and phase estimator that utilizes the output of the frame synchronizer to estimate a timing offset and a phase offset, a phase rotation module receiving the estimated phase offset and the data stream to perform an initial phase correction on the data stream using the estimated phase offset, an interpolation module receiving the estimated timing offset and the phase corrected data stream to generate a timing corrected data stream, and a phase tracking and data detection module receiving the timing corrected data stream to remove a residual phase offset and detect the data.

In another aspect of the invention, there is a synchronization circuit in a digital wireless receiver, comprising a frame synchronizer receiving a data stream, a timing and phase estimator that utilizes the output of the frame synchronizer to estimate a timing offset and a phase offset, a derotator receiving the estimated phase offset and the data stream to perform an initial phase correction on the data stream using the estimated phase offset, an interpolation module receiving the estimated timing offset and the phase corrected data stream to generate a interpolated data stream, and a phase tracking and data detection module receiving the interpolated data stream to remove a residual phase offset and synchronize the data in the data stream.

In another aspect of the invention, there is a digital communications receiver capable of receiving a signal stream having a plurality of data frames, wherein the signal stream is used to synchronize portions of the receiver, comprising a sampling circuit capable of sampling symbol levels in a synchronizing signal sequence of a data frame, a pulse shaping filter capable of receiving and filtering the sampled signal sequence, a frame synchronization circuit capable of receiving the filtered signal sequence and correlating a unique word with the filtered signal sequence, a threshold detection mechanism in communication with the frame synchronization circuit and capable of determining whether synchronization has occurred, an interpolation coefficient generator in communication with the frame synchronization circuit and capable of generating coefficients for timing estimation and phase estimation, a timing and phase estimator that utilizes the output of the frame synchronization circuit and of the interpolation coefficient module to estimate a timing offset and a phase offset a dynamic interpolator receiving the estimated timing offset, the estimated phase offset and the signal stream to generate a timing corrected signal stream, and a decision directed phase tracker capable of receiving the timing corrected signal stream removing residual phase offsets.

BRIEF DESCRIPTION OF THE DRAWINGS

The above and other aspects, features and advantages of the invention will be better understood by referring to the following detailed description of the preferred embodiment, which should be read in conjunction with the accompanying drawings, in which:

FIGS. 3a and 3b are diagrams illustrating two possible roots to a parabolic interpolation equation for timing estimation as used by the receiver of FIG. 1.

DETAILED DESCRIPTION OF THE PREFERRED EMBODIMENT

The following detailed description of the preferred embodiments presents a description of certain specific embodiments of the present invention. However, the present invention can be embodied in a multitude of different ways as defined and covered by the claims. In this description, reference is made to the drawings wherein like parts are designated with like numerals throughout.

Figure 1:
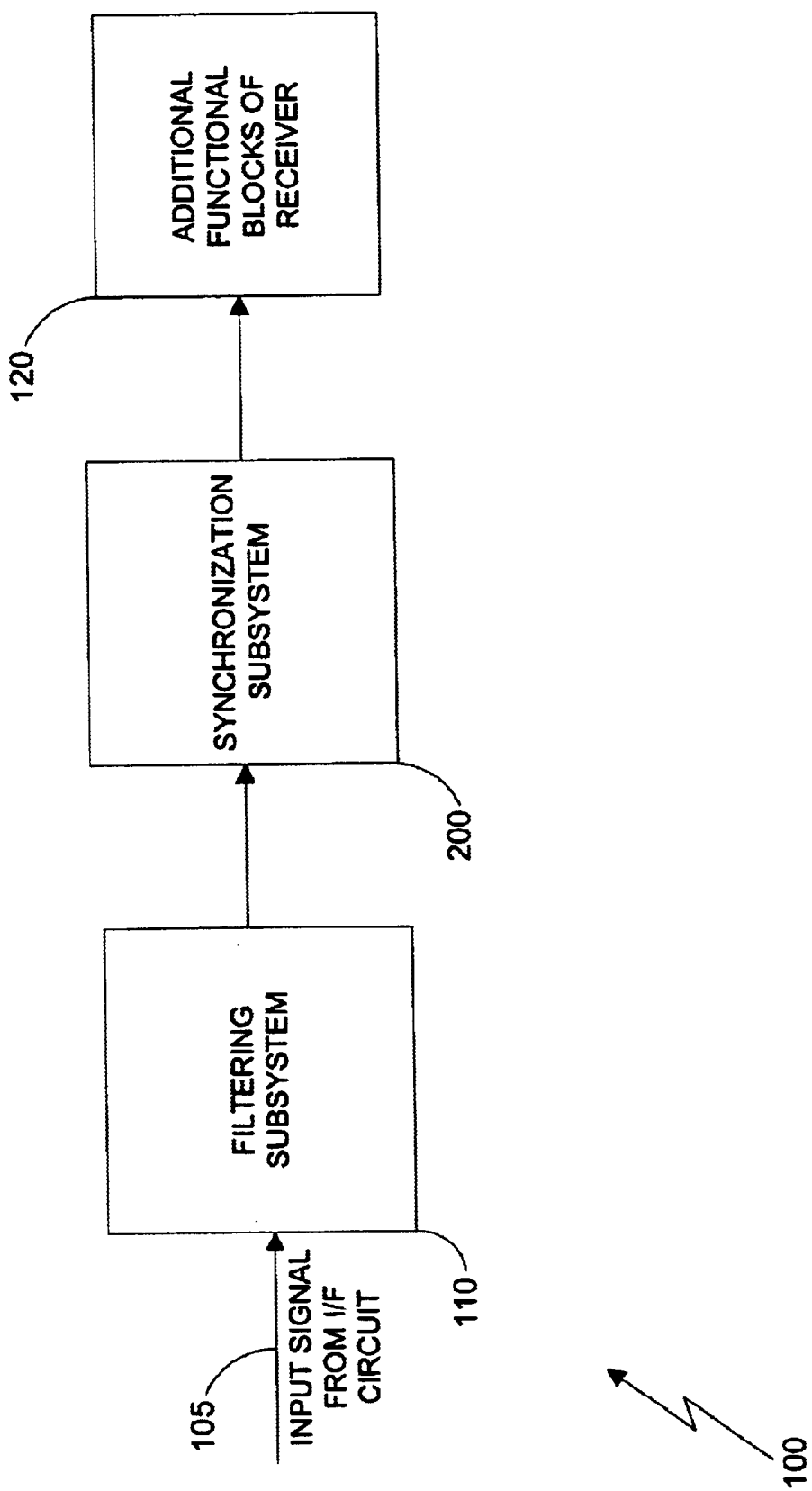
FIG. 1 is a functional block diagram of a digital receiver using the joint frame, timing and phase estimation method.

Referring to FIG. 1, a digital receiver 100 using the joint frame, timing and phase estimation method will be described. The digital receiver 100 supports full-duplex voice and data communications.

In one embodiment, the digital receiver 100 comprises a filtering subsystem 110, a synchronization subsystem 200 and other additional functional blocks 120. The synchronization subsystem 200 includes the elements of a demodulator. The filtering subsystem 110 may include a pulse-shaping filter. The filtering subsystem 110 receives a data stream 105 from an Intermediate Frequency (IF) block (not shown) within a wireless communication system. This data stream 105 is sampled at an Analog to Digital Converter (ADC) with a fixed clock within the IF block. The sampling rate is equal to two samples per bit (two samples being the minimum sampling rate to be used) as shown in FIG. 11b. The sampled data stream 105 is then fed into a pulse-shaping filter within the filtering subsystem 110. The pulse-shaping filter is preferably matched to a pulse-shaping filter used at the transmitter within the wireless multimedia system. The pulse-shaping filter provides optimal performance in the presence of Additive White Gaussian Noise (AWGN). Furthermore, the pulse shaping filter is chosen such that the combination of its output and the output of the transmit pulse shaping filter is preferably a Nyquist pulse, that is zero Inter-Symbol Interference (ISI).

In other embodiments, the filtering subsystem 110 may comprise in one embodiment, a Pseudo Noise (PN) code matched filter and a side-lobe suppression filter in addition to a pulse shaping filter. In such an embodiment, the pulse shaping filtered data stream is fed into the PN code matched filter and the sidelobe suppression filter for further processing. The PN code matched filter despreads the incoming data stream in accordance with the PN code used in the transmit stage to recover the original signal. This processing of the data stream by the PN code matched filter may produce sidelobe and inter-user interference. The output of the PN code matched filter is therefore fed into the sidelobe suppression filter to eliminate or minimize the interference. The output from the filtering subsystem 110 is then fed into the synchronization subsystem 200 for further processing.

Figure 2:
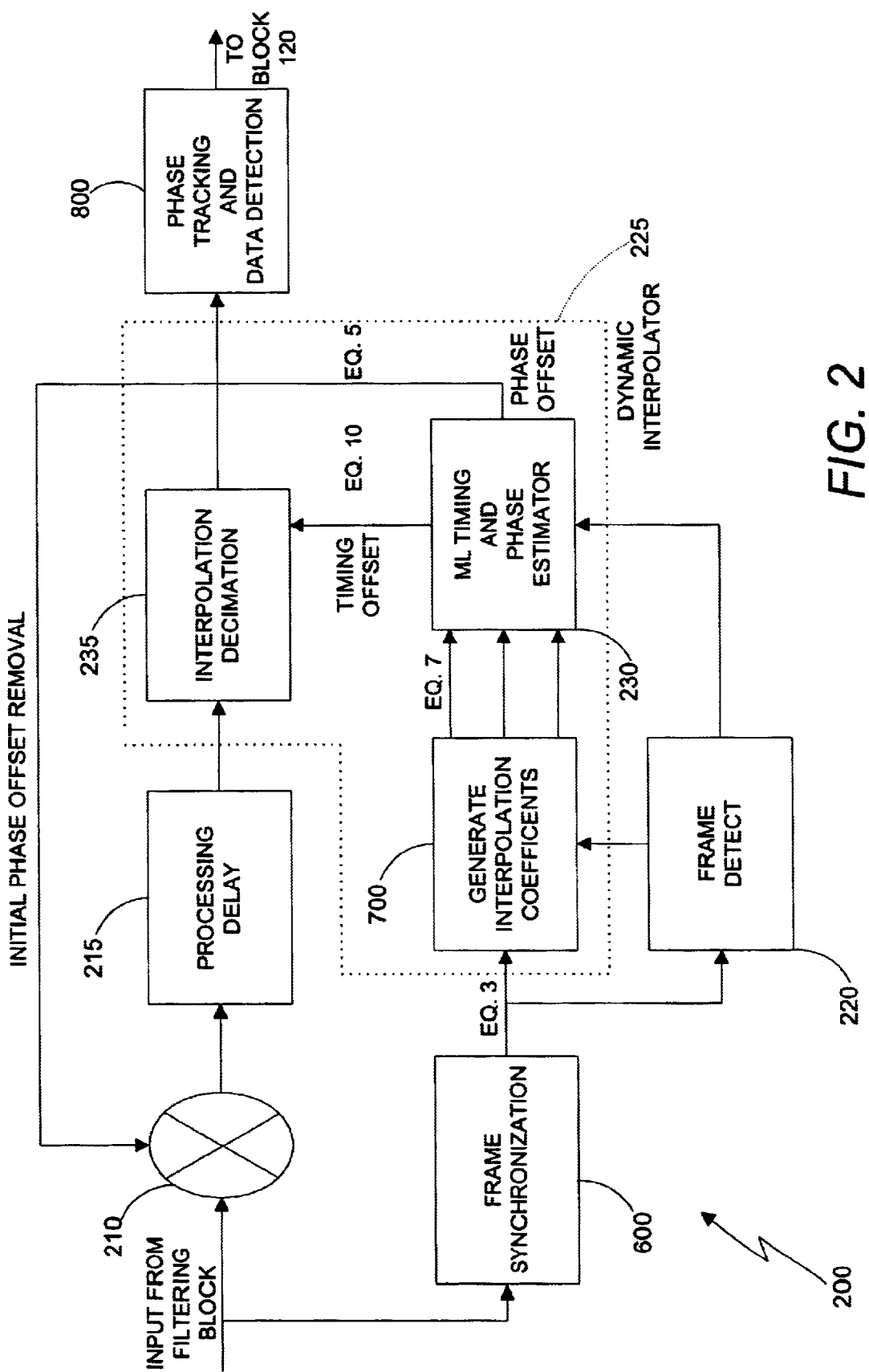
FIG. 2 is a block diagram of the proposed synchronization subsystem shown in FIG. 1.

Referring now to FIG. 2, a functional block diagram of the synchronization subsystem 200 used in the digital receiver 100 is described. The synchronization subsystem 200 establishes frame, timing and phase recovery. The synchronization subsystem 200, comprises a frame synchronization circuit 600, a phase rotation circuit 210, a processing delay block circuit, a frame detect circuit 220, a dynamic interpolator 225 and a phase tracking and data detection circuit 800. The dynamic interpolator 225 comprises a generate interpolation coefficients circuit 700, a maximum likelihood (ML) timing and phase estimator 230, and an interpolation and decimation circuit 235.

The input data stream from the filtering block 110 is fed into the synchronization subsystem 200. This data stream is split into two streams. The first stream is fed into the frame synchronization block 600, whereas the second stream is fed into the phase rotation block 210. The output of the phase rotation block 210 is then fed into the processing delay block 215, which compensates for the delay between the output of the filtering block 110 and the calculation of the initial phase offset, which takes place in phase estimator 230. The outputted data stream from the processing delay block 215 is then fed into the interpolation and decimation block 235, which interpolates the data using the timing estimate from estimator 230. The subsequent redundant samples are removed by the decimation in block 235.

Furthermore, the frame synchronization block 600 performs a correlation of a unique word with the received signal. The output of the frame synchronization block 600 is then fed into both the interpolation coefficients generation block 700 and the frame detect block 220. The frame detect block 220 is responsible for isolating the location of the maximum of the frame synchronization correlation output. The generate interpolation coefficients block 700 is responsible for generating the parabolic coefficients, which are used in the ML timing and phase estimator 230 to calculate the timing and initial phase offsets.

The ML timing and phase estimator 230 has two outputs, namely a timing estimate and an initial phase estimate. The timing estimate is fed into the interpolation and decimation block 235, whereas the phase estimate is fed into the phase rotation block 210. It is necessary to mention that the interpolation and decimation block 235 is very sensitive to the presence of a phase offset on the signal at its input. Therefore, the phase offset generated from the ML timing and phase estimator 230 represents an initial estimate of the phase offset present on the received signal. Additionally, the decimated data stream at the output of block 235 is fed into the phase tracking and data detection block 800. The phase tracking and data detection block 800 is responsible for tracking the residual phase offset, which remains on the signal following the phase rotation block 210. The outputted data stream from the phase tracking and data detection block 800 is fed into the other additional functional blocks 120 within the digital receiver 100, for further processing.

The frame synchronization block 600 is responsible for carrying out the frame synchronization functionality, which can be defined as determining the start of a predefined frame marker (or unique word) in a stream of continuously transmitted frames. Frame synchronization involves performing a "sliding" correlation over discrete time of the received signal from the filtering block 110 and comparing the obtained value with a threshold. If the threshold is exceeded then that position is considered to be the start of the frame. Reliable frame synchronization requires careful selection of the unique word to minimize correlation sidelobes and the probability of false synchronization. Frame synchronization is easier to perform following data detection and removal of unknown parameters. However, in the synchronization subsystem 200, frame synchronization is considered the first synchronization unit of the digital receiver system 100 (FIG. 1). Frame synchronization can be realistically considered as the first stage in the synchronization unit of the receiver when channel conditions are such that the frequency offset is very small with respect to the transmitted data rate. When channel conditions are more severe, as is typically considered in the literature, it is necessary to first remove the effects of phase and frequency offsets to obtain reliable frame synchronization results. In these circumstances the unique word needs to be sufficiently long to overcome the effects of these unknown parameters.

The presence of small frequency offsets reduces the size of the correlation peak, which in turn influences the setting of the threshold. Maximizing the energy of the unique word filter prior to threshold detection requires isolating the magnitude of the output. The output of the unique word matched filter $J(\mu)$, given that the start of the unique word is at $\mu$ and the length of the unique word is $L_{uw}$ is:

$$J(\mu) = \sum_{k=0}^{L_{uw}-1} r((\mu+kL)T_s) a^*_{L_{uw}-k+1}, \qquad \text{Equation 1}$$

where "*" represents the complex conjugate operator, and $$r(mT_s) = \sum_k a_k g(mT_s - kT - \tau)e^{j\phi} + b(mT_s) \qquad \text{Equation 2}$$

represents the received signal sampled at a rate of $mT_s$ following the pulse shaping filter, where $a_k$ is the random transmitted data, g(t) represents the pulse shape matched filter, T is the symbol rate, $\tau$ is the timing offset, $e^{j\phi}$ represents the exponent phase offset and $b(mT_s)$ represents the sampled additive white Gaussian noise of noise spectral density $N_o$. In one embodiment, a conservative threshold is required to ensure detection, which implies that, in practice, more than one value may exceed the threshold. This requires an additional threshold detection circuitry to isolate the true maximum. The received baseband signal is first passed through an antialiasing filter, which is maximally flat over its spectrum so as not to distort the data. In a fully digital receiver implementation, the receiver does not operate on the continuous-time received complex envelope, but rather on a sampled version of it, taken by a fixed clock, which is asynchronous to the transmitter clock. When the sampling frequency $1/T_s$ is larger than twice the maximum frequency of the signal, these samples contain the same information as the continuous time signal (J. G. Proakis, "Digital Communications," Third Edition, McGraw-Hill Publishers, pp. 333–336, 1995). The transmission delay (or timing offset) is hereafter referred to as $\tau$. Noise affects both the phase and amplitude of the transmitted signal and the introduced phase offset is referred to as $\phi$.

Frame and timing estimation are, in general, considered independently. However, in one embodiment, the information obtained from frame synchronization is used in an optimal manner (based on maximum likelihood) to calculate the timing and phase offsets introduced in the channel. Maximum likelihood theory states that joint estimation of all the unknown parameters in a system is the optimum approach for detecting data in white noise (M. H. Meyers and L. E. Franks, "Joint Carrier Phase and Symbol Timing Recovery for PAM Systems," IEEE Transactions on Communications, COM-28(8): 1121–1129, 1977). Furthermore, joint estimation of phase and timing offset involves maximizing a likelihood function associated with the received signal over a fixed observation interval. The term observation interval relates to the number of samples over which the averaging of the unknown parameter takes place. If the unknown parameter is constant or at most, slowly varying, then the interval over which it is more or less constant can be considered the observation interval. Further development gives the following joint maximum likelihood equation $\Lambda(\tau,\phi)$ (or objective function):

$$\Lambda(\tau, \phi) = \text{Re}\left[\sum a_k^* q(kT + \tau)e^{j\phi}\right], \quad \text{Equation 3}$$

where "*" is the complex conjugate operator, and the sampled received signal $q(kT+\tau)$ output of the pulse shaping filter in the filtering block 110 is given by:

$$q(kT) + \tau) = \int_0^T r(mT_s)g(mT_s - kT - \tau)dt. \quad \text{Equation 4}$$

However, estimating the normalized maximum likelihood exponential phase offset $e^{j\phi}$ gives the following estimate:

$$e^{j\phi} = \frac{\sum_k a_k q^*(kT + \tau)}{\left|\sum_k a_k q^*(kT + \tau)\right|}. \quad \text{Equation 5}$$

Substituting this result into the maximum likelihood equation for joint estimation (Equation 3) gives:

$$\Lambda(\tau) = \left|\sum_k a_k^* q(kT + \tau)\right|. \quad \text{Equation 6}$$

Figure 4:
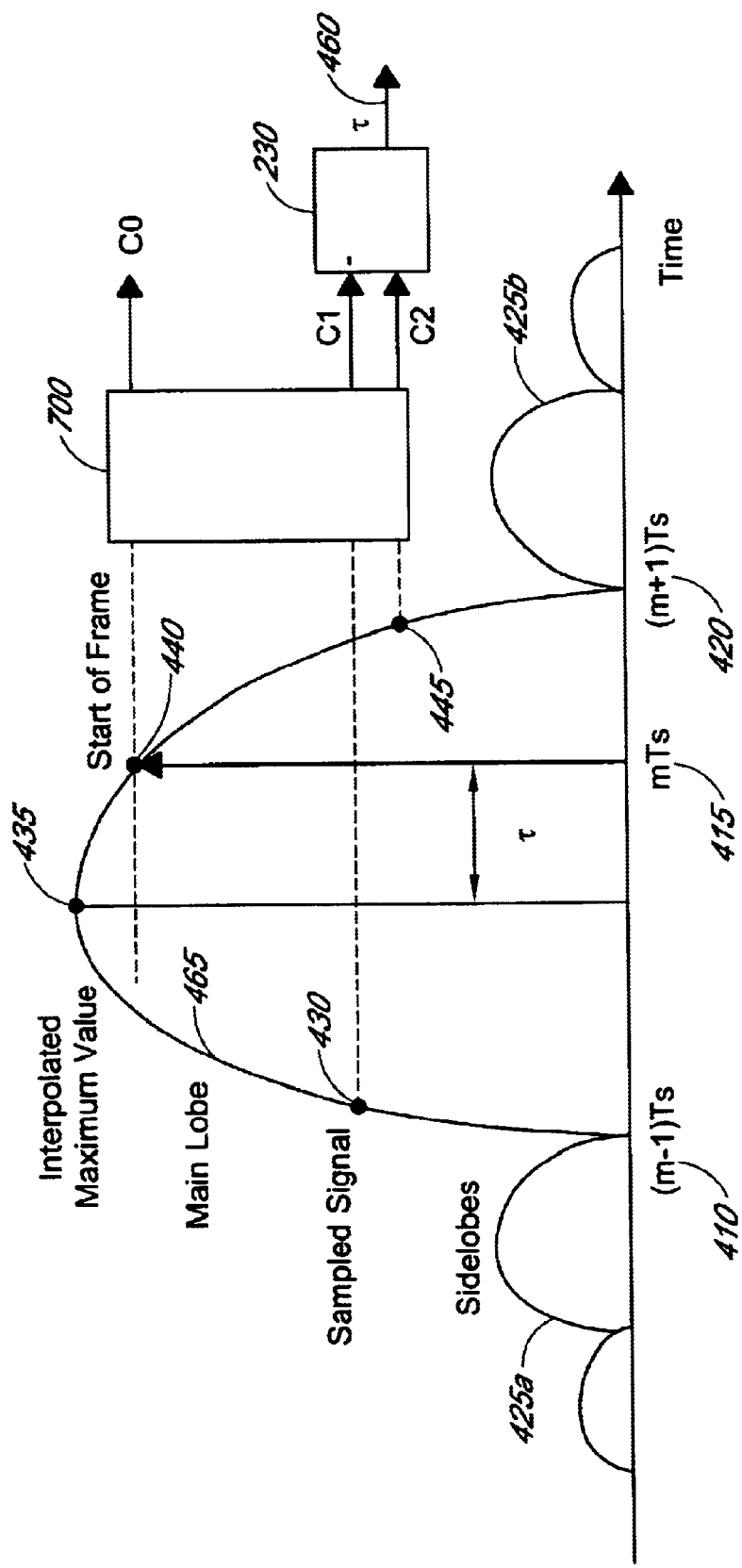
FIG. 4 is a diagram illustrating a proposed technique for timing estimation as used by the receiver of FIG. 1.

Given that the data is known, which occurs during the transmission of the unique word for frame synchronization, the frame synchronization output (Equation 3) is utilized for timing as well as initial phase estimation as shown by the ML timing and phase estimator 230. This is possible by making the observation from Equation 3 that the ideal maximum of the frame synchronization output from the frame synchronization block 600 also corresponds to the maximum likelihood sampling instant of the received signal. Therefore, the sampling instant corresponding to the true maximum of the frame synchronization output is the ML timing estimate. Note that due to limited oversampling of the received signal, the observed and the true frame synchronization peaks are not identical. Therefore, increasing the oversampling rate of the received signal reduces this error. Additionally, the location of the true maximum can more accurately be determined. This observation suggests that the interpolation should be carried out over the observed peak at the frame synchronization output (Equation 3) to detect the location of the true maximum. In one embodiment, an approximation is made that a parabola, as illustrated in FIG. 4, can approximate the shape of the main lobe peak of the frame synchronization correlation. In addition, the phase of the frame synchronization output from (Equation 5) gives an estimate of the maximum likelihood phase offset induced in the channel. In situations where there is a constant phase offset, this estimate is sufficient to de-rotate the received signal prior to data detection by phase rotation block 210.

The outputted data stream from the frame synchronization block 600, which corresponds to Equation 3 above, is used to generate the parabolic interpolation coefficients in the generate interpolation coefficients block 700. For parabolic interpolation, three samples of the output of the frame synchronization block 600 are required to generate the three interpolation coefficients in the generate interpolation coefficients block 700, as further illustrated in FIG. 7 and defined as follows:

$$c_m(0) = y((m-1)T_s)$$
$$c_m(1) = 0.5[y(mT_s) - y((m-2)T_s)]$$
$$c_m(2) = -y((m-1)T_s) + 0.5[y(mT_s) + y((m-2)T_s)] \quad \text{Equation 7}$$

where $c_m(1)$ is the value of the coefficient $c_1$ at $mT_s$ as shown at output 755, and y(.) represents the samples of the magnitude of the correlation output from the frame synchronization block 600. In addition to using the output of the frame synchronization block 600 (Equation 3), the frame synchronization detection instant from the frame detection block 220 is also used, in one embodiment, to avoid unnecessary calculation of the interpolation coefficients when frame synchronization has not yet been achieved. More details on alternative interpolation filter coefficients can be found in the literature (L. Erup, F. M. Gardner and R. A. Harris, "Interpolation in Digital Modems-Part II: Implementation and Performance," IEEE Transactions on Communications, 41:998–1008, June 1993). The parabolic interpolation coefficients represent the coefficients of a quadratic, which correspond to the correlation peak, where the unknown parameter is the timing offset.

Upon completion of the generation of the interpolation coefficients in the generate interpolation coefficients block 700, the task of timing and phase offset estimation can begin in the ML timing and phase estimator 230. Using the approximation that the frame synchronization main lobe 465 output (FIG. 4) can be approximated as a parabola, the timing estimate $\hat{\tau}$ can be written in terms of the interpolation coefficients and the unknown timing offset:

$$\hat{\tau} = \max_\tau |\tau^2 c_m(2) + \tau c_m(1) + c_m(0)|. \quad \text{Equation 8}$$

The solution (or the optimum sampling instant) corresponds to the location of the maximum of this quadratic. The solution to this equation is impractical; however, a solution is possible if the observation is made that the solution to the square of Equation 8 is also the solution to Equation 8, which also implies that Equation 8 can be rewritten as the product of its roots. Root 1 and root 2 correspond to the two roots of Equation 8:

$$\hat{\tau} = \max_\tau |\tau - \text{root1}|^2 |\tau - \text{root2}|^2. \quad \text{Equation 9}$$

FIG. 3 illustrates the above ad-hoc solution for the calculation of the timing estimate, which is calculated as the average of the two roots of Equation 9 and normalizing the solution by multiplying by the complex conjugate of $c_m(2)$:

$$\hat{\tau} \approx \text{Re}\left[\frac{-c_m(1)c_m^*(2)}{2|c_m(2)|^2}\right], \quad \text{Equation 10}$$

where Re[.] refers to the Real operator. This is the timing estimate formed in the ML timing and phase estimator 230.

Having resolved a method of isolating the timing offset, the next stage is to estimate the phase offset in the system. A simple observation from Equation 3 is that the phase of the frame synchronization correlation output, at the instant of ideal timing estimation, gives the maximum likelihood phase estimate. This estimate gives a reliable initial phase offset for data de-rotation prior to a more accurate phase and frequency estimation when the channel induces a slowly varying phase offset or when the transmitted packets are sufficiently short such that the phase offset is assumed to be slowly varying over the entire packet. The maximum likelihood phase estimate calculated in the ML timing and phase estimator 230 is therefore:

$$e^{j\phi} = \frac{\tau^2 c_m(2) + \tau c_m(1) + c_m(0)}{|\tau^2 c_m(2) + \tau c_m(1) + c_m(0)|}, \quad \text{Equation 11}$$

which is simply the phase of Equation 8 and one embodiment of the maximum likelihood exponential phase estimate derived in Equation 5. However, it can also be noted that the interpolation coefficient $c_0$ corresponds to the detected maximum of the frame synchronization output (Equation 3). Furthermore, to give a simpler approach to estimating the phase offset, it should be noted that when the phase offset induced in the channel is slowly varying over the observation interval then the phase offset corresponding to the detected frame peak is almost identical to the true phase offset from maximum likelihood. Therefore, the phase of $c(0)$ is used as an initial phase offset to de-rotate the data. This is the initial phase estimate generated at the output of the ML timing and phase estimator 230:

$$e^{j\phi} = \frac{c_m(0)}{|c_m(0)|}. \quad \text{Equation 12}$$

Figure 8:
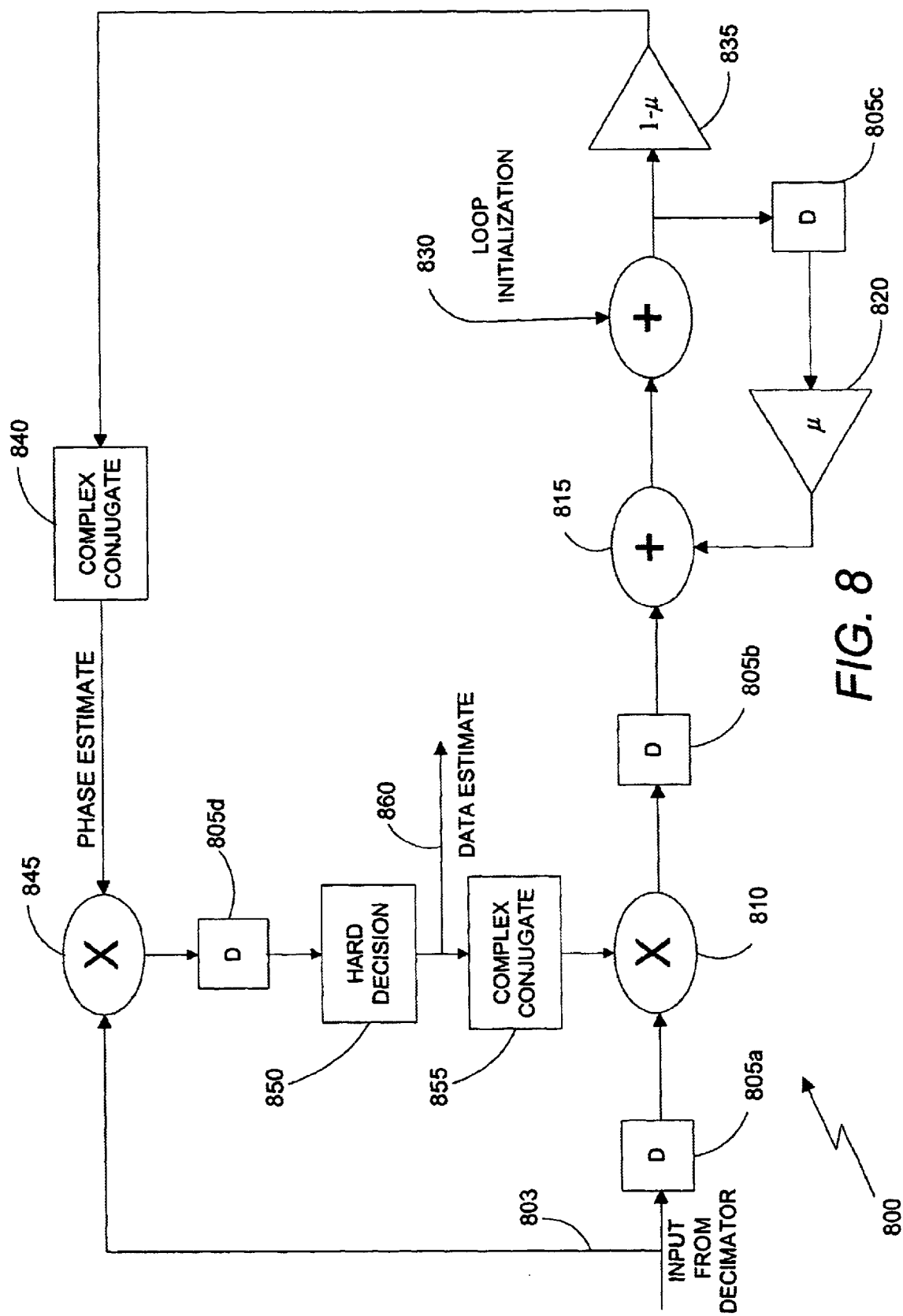
FIG. 8 is a block diagram of a phase tracking loop circuit used to remove a residual phase offset following decimation, related to FIG. 2.

Following estimation of the phase offset, the next step is to de-rotate the input to the unique word matched filter by the phase estimate. This helps improve the performance of the data interpolation and decimation circuit 235, which estimates the data corresponding to the optimum sampling instant, and removes the redundant samples. Interpolation circuits are sensitive to phase offsets. Further information regarding the operation and implementation of the data interpolator and decimator can be obtained in the open literature {(F. M. Gardner, "Interpolation in Digital Modems-Part 1: Fundamentals," IEEE Transactions on Communications, 41:501–507, March 1993) and (L. Erup, F. M. Gardner and R. A. Harris, "Interpolation in Digital Modems-Part II: Implementation and Performance," IEEE Transactions on Communications, 41:998–1008, June 1993). The resulting signal output from the interpolation and decimation block 235 is one sample per symbol. The final stage in the synchronization unit is the implementation of a real-time phase offset tracking estimator in the phase tracking and data detection block 800. The proposed estimator has a decision directed feedforward configuration, which is shown in FIG. 8.

Referring now to FIGS. 3a and 3b, the proposed ad-hoc solution for the calculation of the timing estimate is illustrated. Two curves 305a and 305b with their roots 315a and 315b, which represent Equation 9, are illustrated in FIG. 3a. The product of these curves 305a and 305b shown in FIG. 3b, is the square of the parabola approximating the main lobe 465 (FIG. 4) of the frame synchronization correlation output. Note that the approximate maximum 320 of the product of these two curves, as shown in FIG. 3b, can be approximated as the average of the two roots 310. This observation led to the ad-hoc timing estimate in Equation 10.

Referring now to FIG. 4, the continuous time and discrete time sampled magnitude of the correlation output from the frame synchronization unit 600 in FIG. 2 will be described. Both the continuous and discrete time representations of the frame synchronization output 600 in FIG. 2 consist of a main lobe 465 with adjacent smaller lobes known as sidelobes 425a and 425b. The original signal at the input of the frame synchronization unit 600, is sampled at discrete intervals (m−1)Ts, mTs, (m+1)Ts shown at 410, 415 and 420, respectively. The equivalent samples of the discrete correlation function are illustrated at points 430, 435 and 445, respectively. Note that although the discrete samples of the sidelobes are not shown, they are similarly sampled. Only three samples of the correlation main lobe 465 are shown, as parabolic interpolation over the main lobe 465 for timing estimation only requires three samples. The three samples illustrated represent the detected maximum 440 at the output of frame detection block 220 (FIG. 2), and the two adjacent samples 430 and 445. These three samples are then used in the generate interpolation coefficients block 700 to calculate the parabolic interpolation coefficients given earlier in Equation 7, and also in FIG. 7 at outputs 730, 755 and 760.

Figure 7:
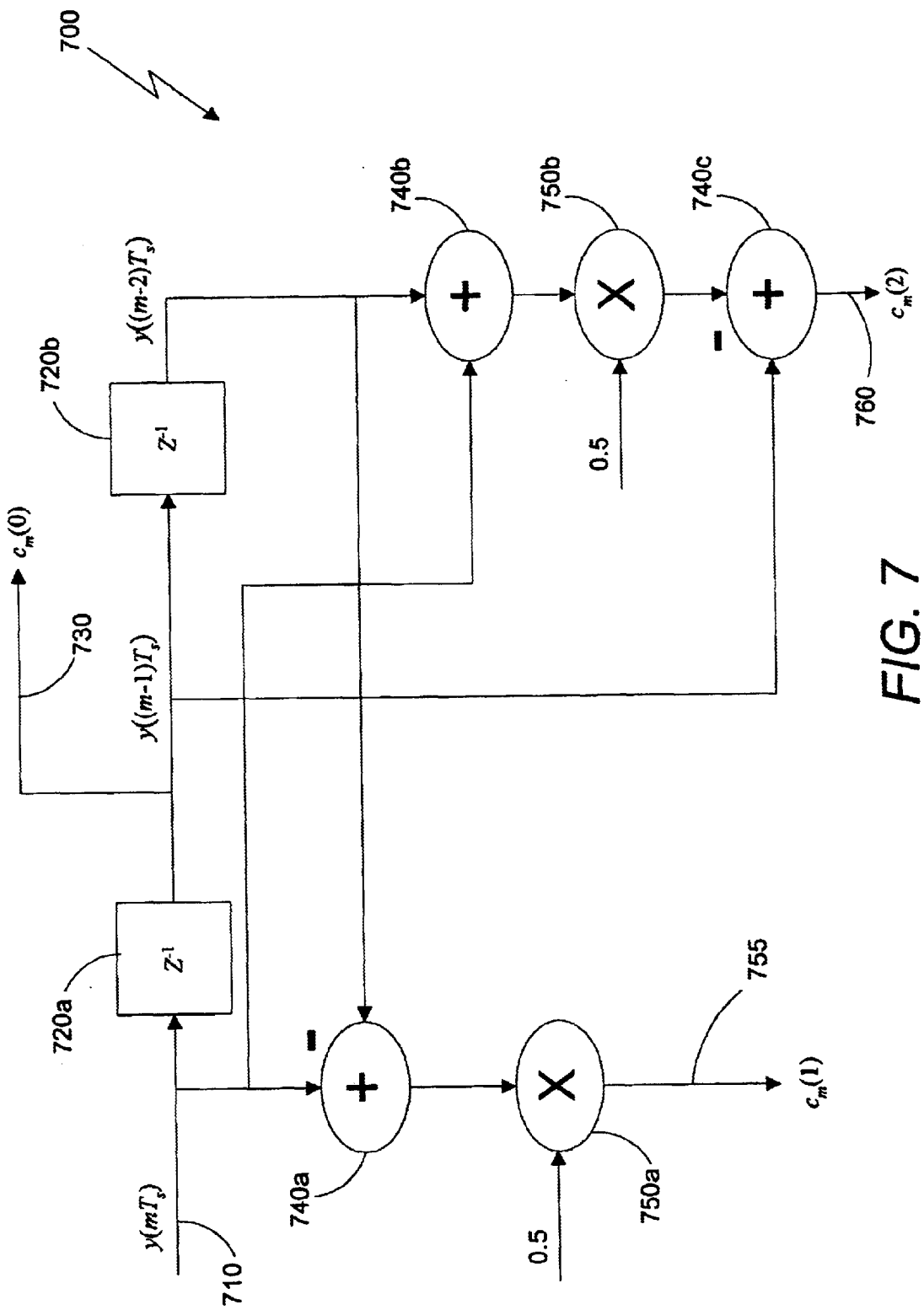
FIG. 7 is a block diagram of a circuit for determining parabolic interpolation coefficients, related to FIG. 2.

Using the parabolic coefficients c(1) 755 and c(2) 760 from FIG. 7, the timing offset 460 is calculated in the ML timing and phase estimator 230 according to Equation 10. The interpolation coefficients calculated at the output of the generate interpolation coefficients block 700 represent the coefficients of a parabola to approximate the shape of the main lobe 465 as previously described by Equation 8. The maximum of Equation 8 is the true location of the maximum of the frame synchronization correlation output. The sampling clock phase difference between the detected and true locations of the frame synchronization outputs at points 440 and 435 represents the calculated timing offset at the timing offset output 460. The coefficient c(0) at the output of generate interpolation coefficients block 700 can be used as an approximation to the initial phase offset introduced in the channel as discussed at Equation 12. The timing offset is then fed to the interpolation and decimation block 235 (FIG. 2) and the phase offset is fed to the phase rotation block 210.

Figure 5:
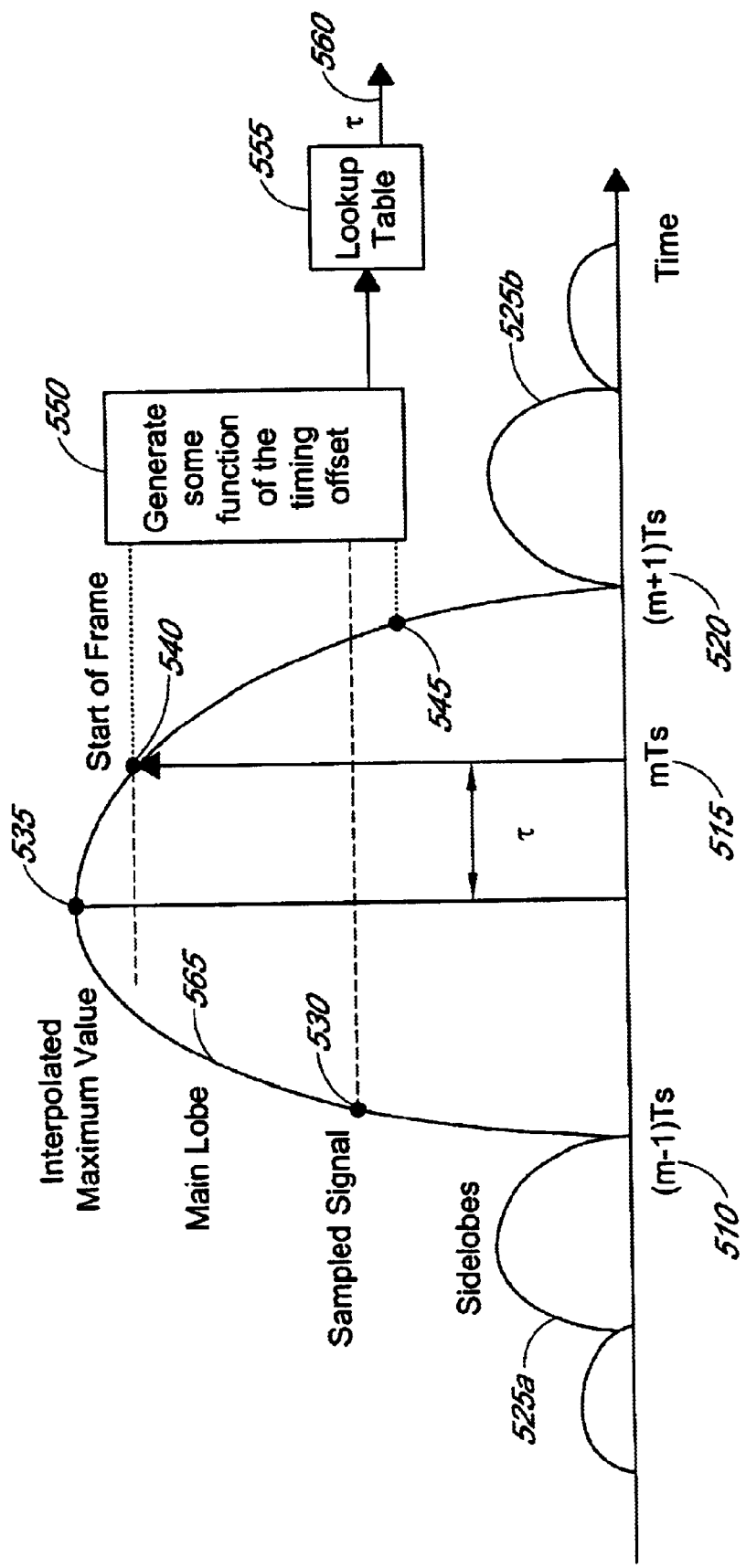
FIG. 5 is a diagram illustrating an alternative approach to timing estimation using a look-up table.

Referring now to FIG. 5, an alternative approach to estimating the timing offset is presented. FIG. 5 illustrates the continuous time and discrete time sampled magnitude of the correlation output from the frame synchronization unit 600 in FIG. 2. Note that both the continuous and discrete time representations of the frame synchronization output 600 in FIG. 2 consist of a main lobe 565 with adjacent smaller lobes known as sidelobes 525a and 525b. The original signal at the input of the frame synchronization unit 600 from FIG. 2, is sampled at discrete intervals (m−1)Ts, mTs, (m+1)Ts, etc., illustrated at 510, 515 and 520, respectively. The equivalent samples of the discrete correlation function are illustrated at points 530, 535 and 545, respectively. Although the discrete samples of the sidelobes are not shown, they are similarly sampled. Only three samples of the correlation main lobe 565 are shown, as these are sufficient to calculate the timing offset. The three samples illustrated represent the detected maximum 540 at the output of frame detect block 220, and the two adjacent samples 530 and 545. These three samples are then used in a block 550 to calculate some function of the timing offset, which can then be applied to the lookup table in a block 555 to give the timing offset at an output 560. This avoids the computational complexity in the formation of the timing offset at the timing estimator 230 associated with the implementation outlined in FIG. 4. This timing offset is subsequently fed to the interpolation and decimation block 235 in FIG. 2.

Figure 6:
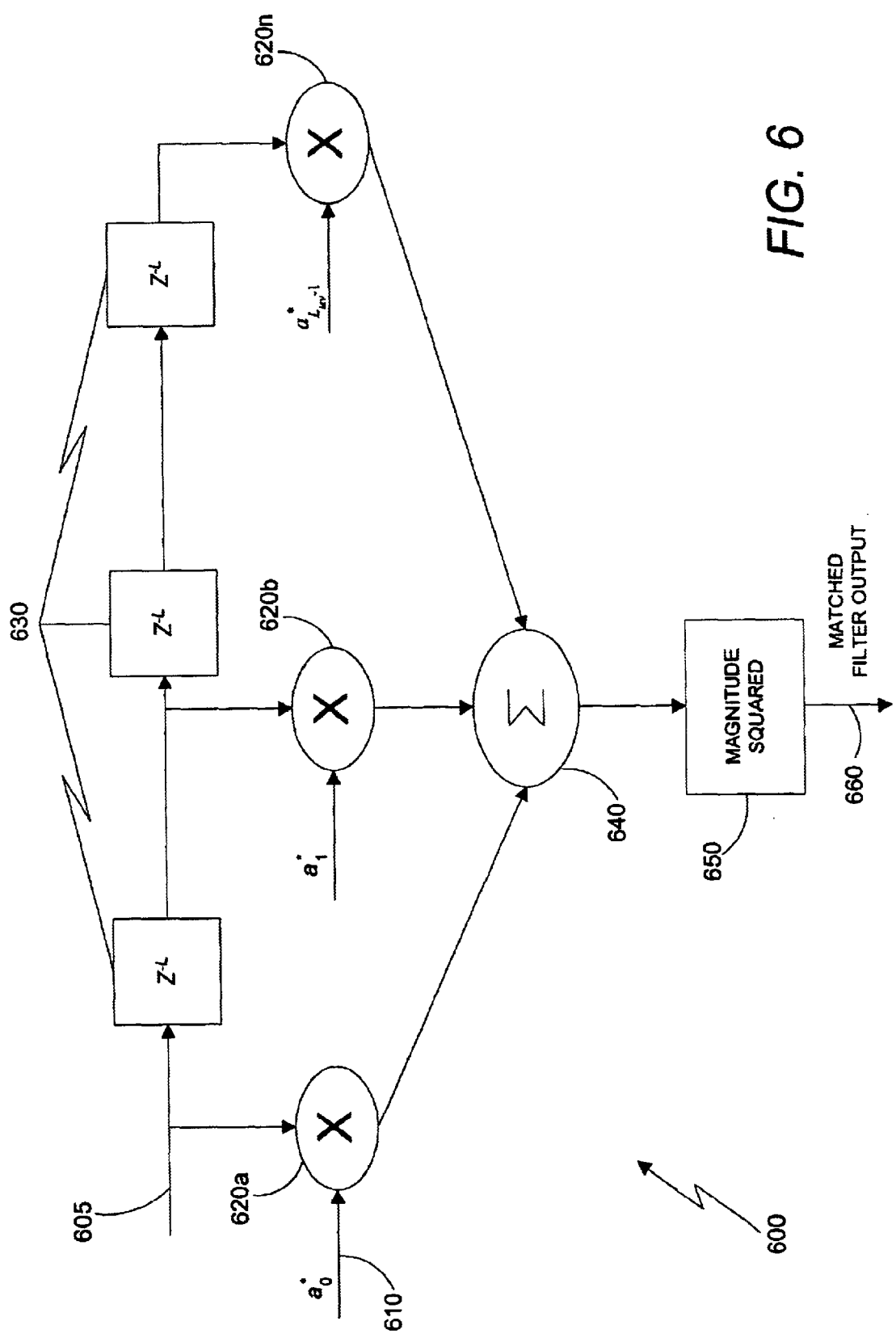
FIG. 6 is a diagram illustrating a structure of the unique word matched filter (frame synchronization) shown in FIG. 2.

Referring to FIG. 6, the structure of the unique word matched filter for an oversampled input signal 605 of L samples per symbol will be described. Because the unique word filter is a matched filter, the order of the coefficients 610a, 610b, etc. are in reverse order to the order that the unique word was inserted at the transmitter. Also, instead of unit delays, as is typical in filters, in this embodiment, the delay between the filter taps is equal to the oversampling ratio of the received signal as shown at 630. This ensures the correlation at an output 660 of the unique word matched filter is as though its input signal 605 is operating at one sample per symbol as required to obtain the correct correlation waveform from the matched filter. Following multiplication of the input signal 605 by the coefficients 610a to 610n at 620a to 620n, the outputs are summed together at summer 640. To minimize the effect of a phase offset present on the input signal 605, the output of the filter is fed to a magnitude squared block 650. It should be noted that in case of complex modulation, such as Quadrature Phase Shift Keying (QPSK), two matched filters are required. In QPSK, the unique word is present on both the real and imaginary components of the data stream. In this case, both filter outputs are fed into the magnitude squared block 650. By doing so, the effect of the phase offset on the output of the matched filter is removed. The output 660 is subsequently fed to the frame detection unit 220 (FIG. 2).

Referring to FIG. 7, one implementation of a circuit to calculate the parabolic interpolation coefficients for the timing estimation will be described. This is a direct implementation of the equations of Equation 7. An input 710 is the magnitude of the frame correlation output of frame synchronization block 600 (FIG. 2). There are two unit delay components 720a and 720b to form the delayed signal components $y((m-1)T_s)$ and $y((m-2)T_s)$. The signal at the output of the first delay is the first coefficient $c_m(0)$ as illustrated at an output 730. Forming the second coefficient $c_m(1)$ involves determining the difference between the input signal 710 and the delayed signal after delay component 720b. A constant of 0.5 then multiplies the output at multiplier 750a to give the second coefficient at an output 755. The third coefficient involves first adding the input signal 710 to the signal at the output of delay component 720b, multiplying it by 0.5 at multiplier 750b and subtracting the first component from its value at subtractor 740c to give the third coefficient $c_2(m)$ at an output 760.

Referring now to FIG. 8, the phase tracking and data detection circuit 800 will be described. The phase tracking detection block includes a decision directed feedforward estimator with a built-in hard decision data detection block 850. The phase tracking and data detection block 800 may be a decision directed loop, which implies that a decision on the transmitted data is made within the loop and is used to assist in the estimation of the residual phase and frequency offset present on the received signal. The phase tracking and data detection block 800 is considered a feedforward structure in that it does not use an error tracking mechanism on the unknown parameter as a means of improving the estimation as is used in classic feedback synchronization estimators (J. G. Proakis, "Digital Communications," Third Edition, McGraw-Hill Publishers, pp. 333–336, 1995). The term hard decision means that the decision is a level based threshold operation. The hard decision block 850 operates as follows: If the signal value at the input of the hard decision block 850 is below a predefined threshold value, the decision at the output of the hard decision block 850 is that a logic low is detected, and vice versa for a logic high.

The concept of the phase tracking loop is to first remove the effect of the data from the received signal stream by multiplying the delayed received signal 805a by the complex conjugate of the data 855 at multiplier 810. Multiplying any signal stream by the complex conjugate of its data stream removes the data (J. G. Proakis, "Digital Communications," Third Edition, McGraw-Hill Publishers, pp. 333–336, 1995) from the signal stream and isolates the noise and/or any phase offset present on the remaining stream. Forming the complex conjugate of the data in the complex conjugate block 855 involves changing the sign of the imaginary component of the estimated data stream 860. The signal at the output of the multiplier 810 represents the instantaneous value of the residual phase offset in noise. The delay elements 805a, 805b, 805c and 805d ensure the stability of the phase tracking and data detection block 800. A loop of components 815, 825, 830, 835, 805c and 820 comprise the averaging loop for the instantaneous exponential phase error. The delay element block 805c is necessary to ensure the stability of the feedback loop. Therefore, the most recent instantaneous values of the exponential phase offset are of greater significance or weight than older samples.

In the presence of noise, the accuracy of an instantaneous parameter estimate, which might be phase, frequency or timing offset, is subject to the noise levels present on the received signal (as indicated by the signal to noise ratio). In high signal to noise conditions, an instantaneous estimate is more accurate than an estimate at low signal to noise conditions. Under ideal conditions, where no noise is present on the received signal, the complex conjugate of this instantaneous phase offset can immediately be multiplied by the input signal 803 from the decimation block 235 (FIG. 2) to give the signal requiring a decision in the hard decision block 850. However, under realistic conditions, where noise is present on the received signal, it is necessary to average over the instantaneous phase estimate to improve the reliability of the phase estimate and reduce the effect of the noise variance. The longer the averaging interval (or observation interval), the more accurate the parameter estimate as the effect of the noise is reduced, assuming that the parameter is static or, at most, slowly varying over the averaging interval.

The term observation interval relates to the number of samples over which the averaging of the unknown parameter takes place. If the unknown parameter is constant or, at most, slowly varying then the interval over which it is more or less constant can be considered a suitable observation interval length. However, with improved estimation accuracy comes the additional issue that any fluctuations in the unknown parameter over the observation interval take longer to be reflected in the parameter estimate. This implies that the parameter estimate is not as accurate as it might be. Furthermore, when the parameter estimate is used to derotate the received signal to remove the phase offset, there is a residual phase offset present on the received signal after derotation, which depending on the fluctuations of the phase offset over the channel, may be sufficient to introduce symbol errors at the receiver output. In conclusion, the longer the observation interval, the more the tracking performance of the phase estimator is compromised, whereas the effect of noise on the phase estimate is reduced. Choosing the observation interval length involves achieving a suitable balance between these two priorities.

Block 835 and block 820 together comprise an exponential decay weighting over the averaging process. In other words, the observation interval can be made very long and the exponential decay factor used in block 820 is very close to, but less than, unity. The larger the observation interval, the less jitter (variations on the estimate) on the estimate but also the longer the acquisition time of the phase tracking unit 800 to reflect any changes in the phase offset of the received signal. Therefore, the choice of the value of the exponential decay blocks 820 and 835 requires a compromise between the tracking ability of the phase tracking circuit 800 and reducing the jitter on a phase estimate at the output of a complex conjugate block 840. The averaging loop (components 815, 825, 830, 805c, 820 and 835) averages the instantaneous phase at the output of 805b over what appears to be an infinite observation interval length. From basic mathematics, familiar to an expert in the art:

$$\sum_{i=0}^{\infty} \mu^i = \frac{1}{1-\mu} \quad |\mu| < 1. \qquad \text{Equation 13}$$

This observation is used to average over the instantaneous phase estimates. An initialization value input 830 at adder block 825 is added into the averaging loop. The initialization value is local to the phase estimator. The value of the initialization parameter at 830 is set to a value which is proportional to the sum of the absolute values of the signal samples of either the in-phase (I) or quadrature (Q) branches over the length of the unique word. The loop is initialized to assist in the estimation process. The loop weighs by $\mu$ the sum of the current instantaneous phase estimate at the output of the delay element 805b and the delayed weighted sum from the gain block 820. As the number of iterations increases, the weight behaves as in Equation 13, and so the phase estimate at the output of the adder 815 is weighted by a factor of $1(1-\mu)$. The gain block 835 cancels out the effect of this weight. However, as previously explained, it is not practical to average over an infinite number of samples or the loop's tracking performance will be compromised.

The following relation relates the observation interval length L to the exponential decay factor $\mu$:

$$L = \frac{1}{1-\mu}. \qquad \text{Equation 14}$$

Therefore, in one embodiment where L is 32 samples in length, the exponential decay factor after applying Equation 14 is 0.96875. Therefore, an exponential phase estimate is available at the output of the gain unit 835. Alternatively, from the maximum likelihood equation for phase estimate Equation 5, the exponential gain unit 820 can be replaced by an averager over 32 samples. In this case, block 835 is no longer required. The next stage in the phase tracking circuit 800 is to remove the effect of this exponential phase estimate from the received signal. Given that the samples at the input of the phase tracking and data detection circuit 800 are ideally sampled, the input signal at 803 can be represented by:

$$r_k = \sum_k a_k e^{j\phi} + n_k, \qquad \text{Equation 15}$$

where $r_k$ represents the ideally sampled input signal from the interpolation and decimation unit 235, with the remaining phase offset represented by the exponential phase, the data stream by $a_k$ and the noise samples by $n_k$. The complex conjugate of the exponential phase estimate is formed at the complex conjugate block 840 by inverting the sign of the imaginary component of the exponential phase estimate.

As stated previously, the effect of data can be removed by multiplying the received signal by the complex conjugate of the data stream. Similarly, the phase/frequency offset present on the received signal can be removed by multiplying the sampled received signal samples by the complex conjugate of the phase estimate. The sampled received signal from the decimator as represented by Equation 15 at 803 is then derotated by the complex conjugate of the exponential phase estimate at the multiplier 845. The resulting signal at the output represents, at each sample, a data value in noise. This signal is ready for the hard decision block 850 to make a decision on the estimated data at each sampling instant. The data estimate is available at output 860 and is subsequently fed to additional blocks at 120 (FIG. 1). Again, at complex conjugate block 855, the complex conjugate of the estimated data stream is formed to remove the effect of the data from the sampled received signal to give the instantaneous phase estimate in noise.

Figure 9:
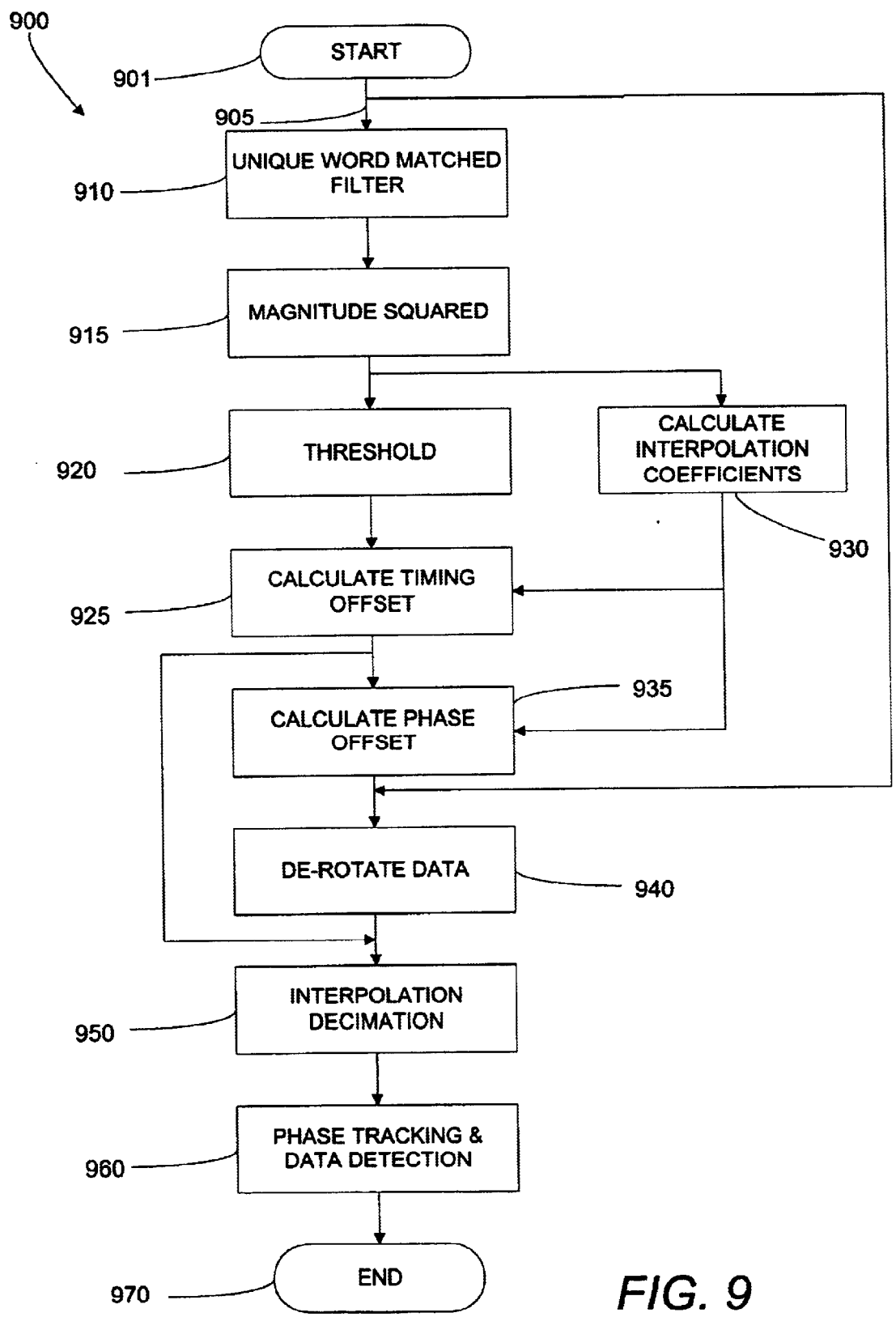
FIG. 9 is a flow diagram of the signal flow in the digital receiver shown in FIG. 2.

FIG. 9 represents the signal flow through the synchronization subsystem 200. Beginning at a start state 901, an input signal 905 is passed to states 910 and 940. The first state 910 is the unique word matched filter, which is required for frame synchronization. The output of the unique word matched filter is then passed through a magnitude-squaring state 915. The next stage is to detect the location of the maximum of the frame correlation output in the threshold detection state 920. The location of the frame synchronization peak is essential to calculating the timing offset at state 925. The timing offset is calculated using the sample surrounding the frame synchronization peak in state 925. Meanwhile the timing offset state 925 also requires the parabolic interpolation coefficients from state 930 to calculate the timing offset. The interpolation coefficients are calculated using the output of the magnitude-squaring state 915. The interpolation coefficients as well as the timing offset are then used in state 935 to calculate the initial phase offset which is used to de-rotate the input signal 905 in state 940. The next stage is to apply the data interpolation and decimation state 950. The implementation of this state can be found in many sources in the literature and would be familiar to one skilled in the art (L. Erup, F. M. Gardner and R. A. Harris, "Interpolation in Digital Modems-Part II: Implementation and Performance," IEEE Transactions on Communications, 41:998–1008, June 1993). The final stage in the synchronization subsystem is the phase tracking and data detection state 960. The phase tracking and data detection state 960 is responsible for removing any residual phase or frequency offset present on the received signal following the initial phase de-rotation in the de-rotate data state 940. The detected data is output from this state and is ready to be fed into the additional functional blocks 120 outlined in FIG. 1. The signal flow ends at an end state 970.

Figure 10A:
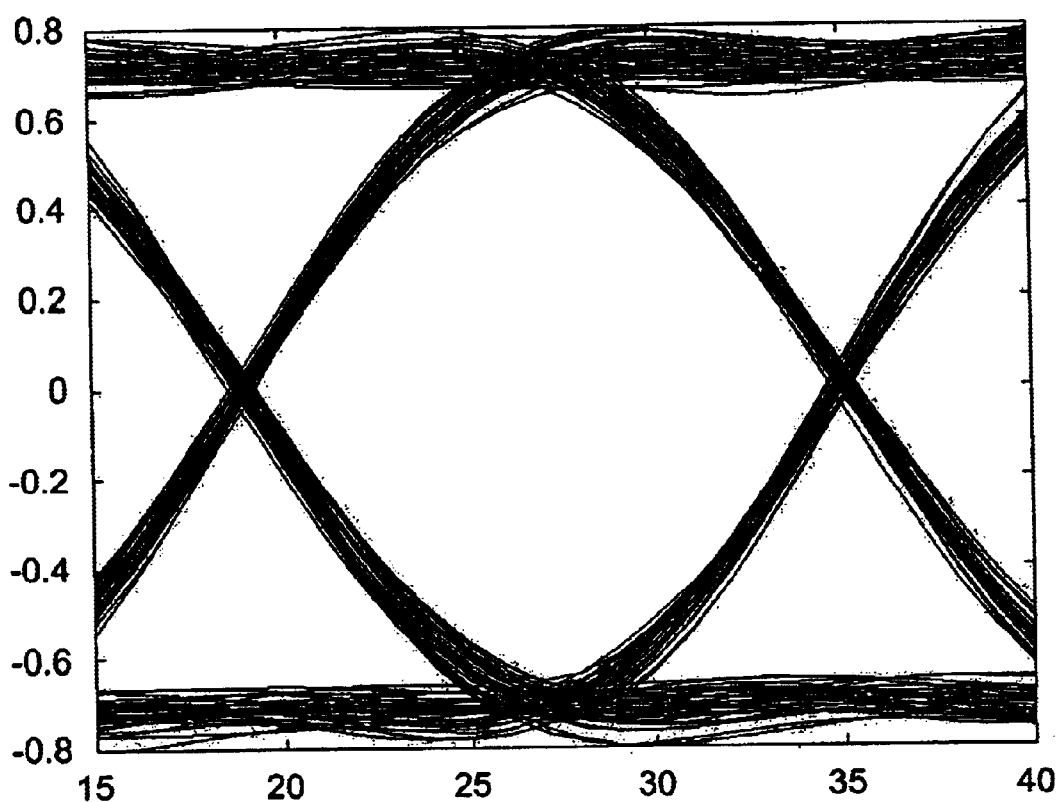
FIGS. 10a and 10b illustrate the formation of an eye diagram at the output of a pulse shaping filter for high and low signal to noise conditions, respectively.
Figure 10B:
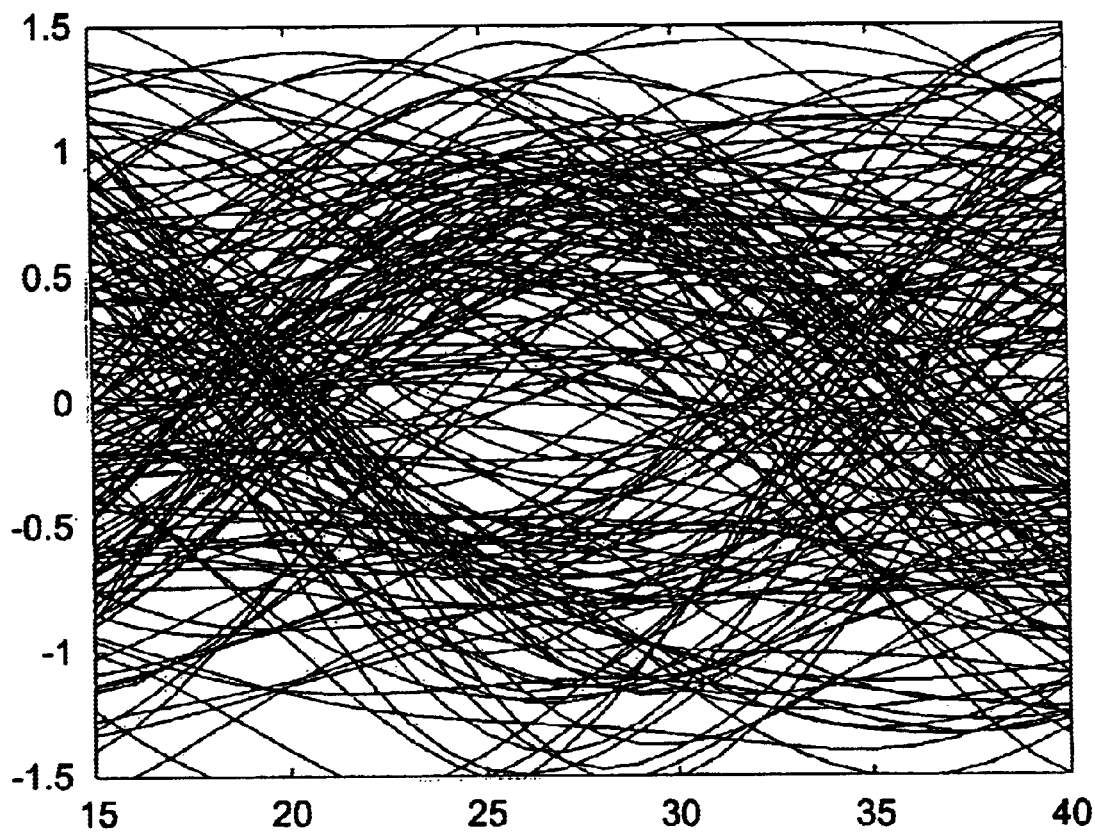

FIGS. 10a and 10b illustrates the concept of an eye opening at high (30 dB) and low (5 dB) signal to noise ratios respectively. Superimposing portions of a signal, equivalent to the duration of one or more symbols, onto itself forms an eye. At high signal to noise conditions there are few fluctuations on the signal so the central portion of the superimposed signal remains clear and tends to form the outline of an eye. This is illustrated in FIG. 10a at 30 dB SNR. FIG. 10b illustrates how the eye closes at lower signal to noise conditions (at 5 dB) due to fluctuations of the amplitude of the signal.

Figure 11A:
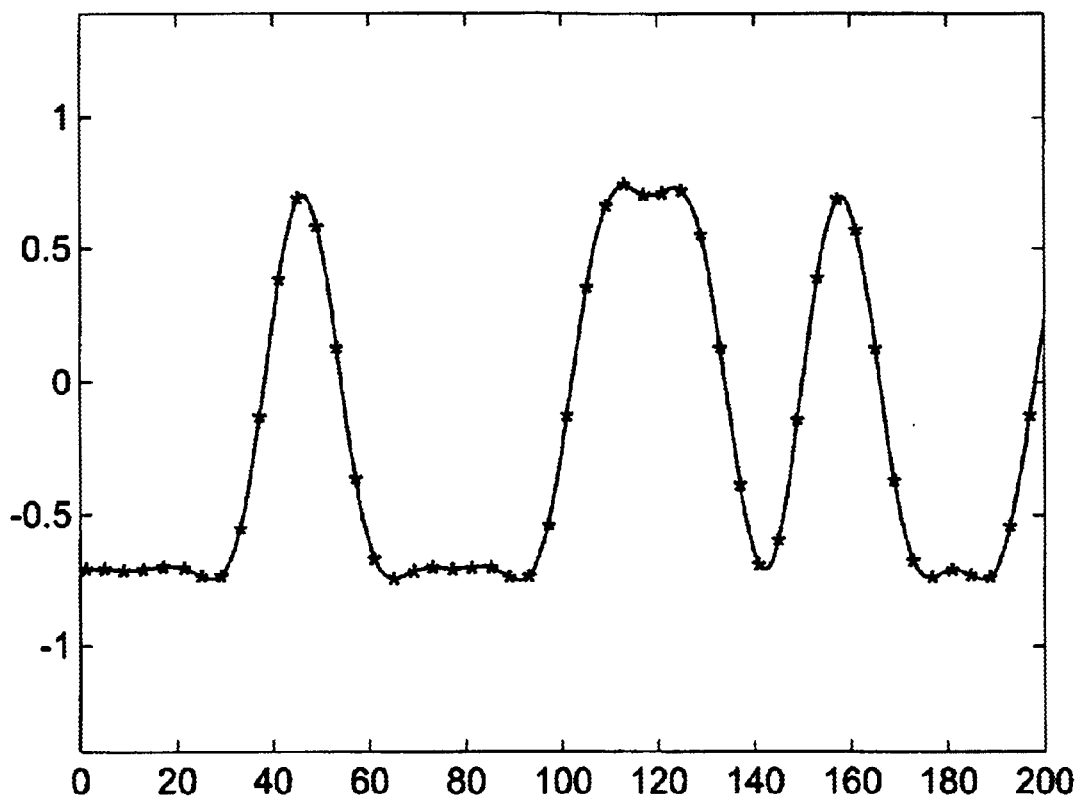
FIG. 11a illustrates the difference between an analog signal and its counterpart sampled signal at four samples per symbol.
Figure 11B:
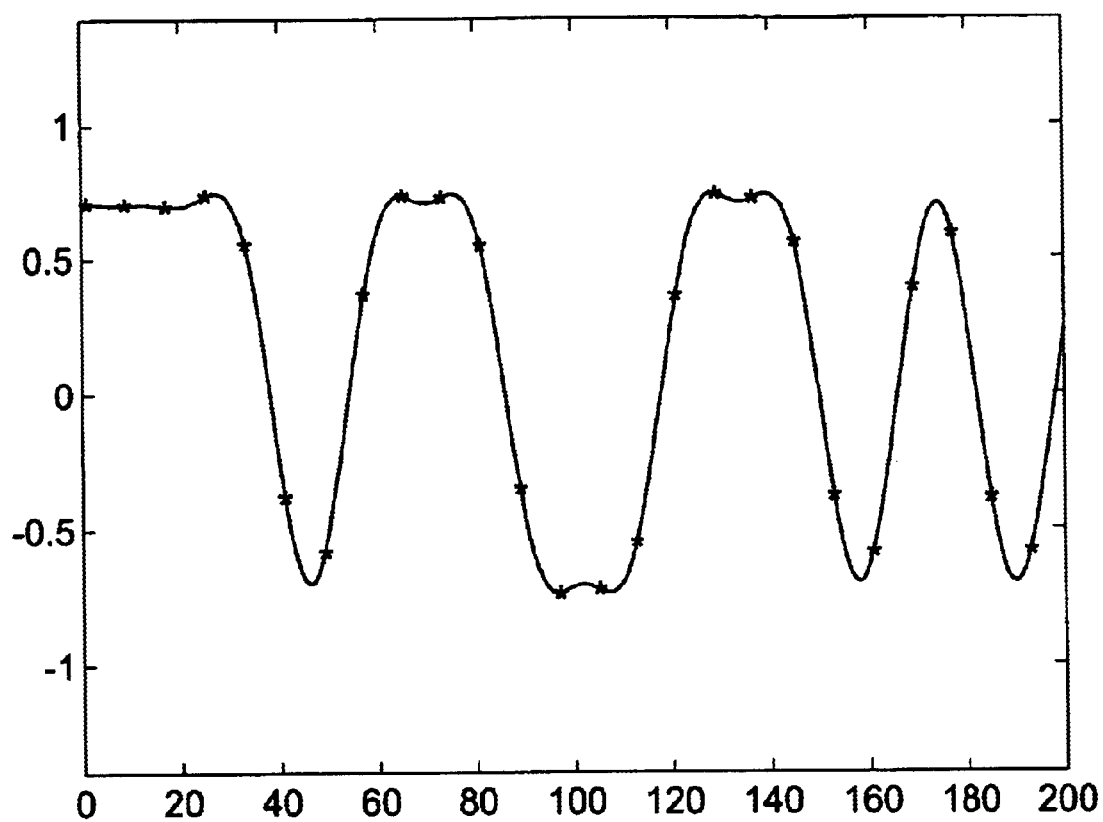
FIG. 11b illustrates the same signal using two samples per symbol.

FIGS. 11a and 11b illustrate the difference between a continuous time and discrete time representation of a signal for the case of taking four and two samples per symbol, respectively. From FIG. 11a (sampling at four samples per symbol), the information available about the signal is much improved over that in FIG. 11b (sampling at two samples per symbol). Therefore the challenge using a digital receiver is to provide the same performance with limited information about the received signal as an analog receiver, which has all the available information to assist in the estimation process.

While the above detailed description has shown, described, and pointed out the fundamental novel features of the invention as applied to various embodiments, it will be understood that various omissions and substitutions and changes in the form and details of the system illustrated may be made by those skilled in the art, without departing from the spirit of the invention.

What is claimed is:

1. A synchronization circuit, comprising:
   a frame synchronizer receiving a data stream that includes data frames;
   a dynamic interpolation module receiving a phase corrected version of the data stream, generating an estimated timing offset, and correcting the phase corrected version of the data stream with the generated timing offset to generate a timing and phase corrected data stream, wherein the dynamic interpolation module includes a timing estimator that utilizes the output of the frame synchronizer to estimate a timing offset, and wherein the estimated timing offset may change for each frame of the data stream; and
   a module for removing a residual phase offset from the timing and phase corrected data stream.

2. A method of synchronizing a digital communications receiver, comprising:
   receiving a signal stream comprising a plurality of data frames;
   obtaining a frame synchronization signal from the signal stream;
   dynamically interpolating a phase offset and a timing offset of the signal stream from the frame synchronization signal;
   correcting the received signal stream with the dynamically interpolated phase offset and timing offset to generate a timing and phase corrected data stream; and
   removing a residual phase offset from the timing corrected and phase corrected data stream.

3. A method of receiving a signal stream in a digital communications receiver, comprising:
   providing an analog signal stream;
   convening the analog signal stream to a digital signal stream;
   correlating a unique word wit the digital signal stream;
   detecting a threshold to determine whether frame synchronization has occurred;
   generating coefficients for timing estimation and phase estimation in response to detecting the threshold;
   estimating a timing offset and a phase offset for the digital signal stream;
   generating a timing corrected and initial phase corrected signal stream from the estimated timing offset, estimated phase offset and the digital signal stream; and
   removing residual phase offsets from the tinting corrected and initial phase corrected signal stream.

4. The method defined in claim 3, wherein the converting is at a rate of two samples per symbol.

5. The method defined in claim 3, wherein the estimating the timing offset and the phase offset utilizes a predetermined maximum likelihood technique.

6. A digital system for detecting data, comprising:
   a frame synchronizer receiving a data stream;
   a timing and phase estimator that utilizes the output of the frame synchronizer to estimate a timing offset and a phase offset;
   a phase rotation module receiving the estimated phase offset and the data stream to perform an initial phase correction on the data stream using the estimated phase offset;
   an interpolation module receiving the estimated timing offset and the phase corrected data stream to generate a timing corrected data stream; and
   a phase tracking and data detection module receiving the timing corrected data stream to remove a residual phase offset and detect the data.

7. The system defined in claim 6, wherein the data stream received by the frame synchronizer is sampled at a rate of two samples per symbol.

8. The system defined in claim 6, wherein the timing and phase estimator operates using a maximum likelihood process.

9. The system defined in claim 6, wherein the timing and phase estimator may estimate a different timing offset and a different phase offset for each frame of the data stream.

10. The system defined in claim 6, wherein the interpolation module is dynamic and operates on a different estimated timing offset for each frame of the data stream.

11. The system defined in claim 6, wherein the interpolation module includes a decimator to decimate the timing corrected data stream.

12. The system defined in claim 6, wherein the phase tracking and data detection module is a feedforward circuit.

13. The system defined in claim 6, additionally comprising a frame detector receiving the results of the frame synchronizer and providing a frame synchronization detection instant to the timing and phase estimator.

14. The system defined in claim 13, wherein the frame synchronization detection instant is representative of a maximum of the frame synchronization output.

15. The system defined in claim 13, additionally comprising an interpolation coefficient module receiving the results from the frame synchronizer and the frame detector and providing at least one interpolation coefficient to the timing and phase estimator.

16. The system defined in claim 15, wherein the interpolation coefficients are used by the timing and phase estimator to estimate the timing offset.

17. A synchronization circuit in a digital wireless receiver, comprising:
   a frame synchronizer receiving a data stream;
   a timing and phase estimator that utilizes the output of the frame synchronizer to estimate a timing offset and a phase offset;
   a derotator receiving the estimated phase offset and the data stream to perform an initial phase correction on the data stream using the estimated phase offset;
   an interpolation module receiving the estimated timing offset and the phase corrected data stream to generate a interpolated data stream; and
   a phase tracking and data detection module receiving the interpolated data stream to remove a residual phase offset and synchronize the data in the data stream.

18. A digital communications receiver capable of receiving a signal stream having a plurality of data frames, wherein the signal stream is used to synchronize portions of the receiver, comprising:
   a sampling circuit capable of sampling symbol levels in a synchronizing signal sequence of a data frame;
   a pulse shaping filter capable of receiving and filtering the sampled signal sequence;
   a frame synchronization circuit capable of receiving the filtered signal sequence and correlating a unique word with the filtered signal sequence;

a threshold detection mechanism in communication with the frame synchronization circuit and capable of determining whether synchronization has occurred;

an interpolation coefficient module in communication with the frame synchronization circuit and capable of generating coefficients for timing estimation and phase estimation;

a timing and phase estimator that utilizes the output of the frame synchronization circuit and of the interpolation coefficient module to estimate a timing offset and a phase offset;

an interpolation module receiving the estimated timing offset and the signal stream to generate a timing corrected signal stream; and a decision directed phase tracker capable of receiving the timing corrected signal stream and removing residual phase offsets.

19. The system defined in claim 18, wherein the estimated timing offset may change for each frame of the data stream.

20. The system defined in claim 18, wherein a one of the data frames comprises a data signal sequence and a synchronizing signal sequence.

21. The system defined in claim 18, wherein the threshold detection mechanism compares values derived from the frame synchronization circuit with a predefined value.

* * * * *